(12) United States Patent
Wakabayashi et al.

(10) Patent No.: US 7,787,349 B2
(45) Date of Patent: Aug. 31, 2010

(54) OPTICAL PICKUP LENS AND OPTICAL PICKUP APPARATUS

(75) Inventors: Koichiro Wakabayashi, Ibaraki (JP); Mitsuhiro Miyauchi, Ibaraki (JP); Yasuyuki Sugi, Ibaraki (JP); Yutaka Makino, Ibaraki (JP)

(73) Assignee: Hitachi Maxwell, Ltd., Ibaraki-shi (JP)

( * ) Notice: Subject to any disclaimer, the term of this patent is extended or adjusted under 35 U.S.C. 154(b) by 1119 days.

(21) Appl. No.: 11/405,436

(22) Filed: Apr. 18, 2006

(65) Prior Publication Data
US 2006/0245315 A1    Nov. 2, 2006

(30) Foreign Application Priority Data
Apr. 21, 2005    (JP) .............................. 2005-123385

(51) Int. Cl.
*G11B 7/00* (2006.01)

(52) U.S. Cl. ............................. 369/112.26; 369/112.08; 369/94

(58) Field of Classification Search ............ 369/112.01, 369/112.02, 112.05, 112.07, 112.08, 44.37, 369/94, 112.23, 112.25, 112.26
See application file for complete search history.

(56) References Cited

U.S. PATENT DOCUMENTS

| | | | |
|---|---|---|---|
| 6,678,096 B2 | 1/2004 | Sugi et al. | |
| 7,180,846 B2 * | 2/2007 | Kim et al. | 369/112.17 |
| 7,269,119 B2 * | 9/2007 | Ikenaka | 369/112.01 |
| 7,457,223 B2 * | 11/2008 | Katsuma et al. | 369/112.08 |
| 7,463,570 B2 * | 12/2008 | Kimura et al. | 369/112.23 |
| 7,564,764 B2 * | 7/2009 | Kimura | 369/112.06 |
| 2004/0246873 A1 * | 12/2004 | Maruyama et al. | 369/112.03 |
| 2005/0201249 A1 * | 9/2005 | Ikenaka | 369/112.01 |
| 2005/0224693 A1 * | 10/2005 | Ikenaka et al. | 250/201.5 |
| 2005/0270958 A1 * | 12/2005 | Ikenaka | 369/112.23 |

FOREIGN PATENT DOCUMENTS

| | | |
|---|---|---|
| JP | A 09-054977 | 2/1997 |
| JP | A 11-287948 | 10/1999 |
| JP | A 2003-270528 | 9/2003 |

* cited by examiner

*Primary Examiner*—Thang V Tran
(74) *Attorney, Agent, or Firm*—Oliff & Berridge, PLC

(57) ABSTRACT

An optical pickup lens focuses laser beams having different wavelengths $\lambda 1$, $\lambda 2$ and $\lambda 3$ on at least three kinds of optical discs. At least one side of the optical pickup lens has a concentric loop zonal structure for compensating wavefront aberration occurring when recording or reproducing an optical disc having a substrate thickness t1 by the laser beam having the wavelength $\lambda 1$ and wavefront aberration occurring when recording or reproducing an optical disc having a substrate thickness t2 by the laser beam having the wavelength $\lambda 2$. When recording or reproducing an optical disc having a substrate thickness t3 by the laser beam having the wavelength $\lambda 3$, a phase difference given to the laser beam having the wavelength $\lambda 3$ due to the concentric loop zonal structure is about $0.15\lambda$ or smaller.

24 Claims, 21 Drawing Sheets

| LOOP ZONE EDGE POSITION | | STEP |
|---|---|---|
| a1 | 0.263 | 0 |
| a2 | 0.390 | -h |
| a3 | 0.507 | -2h |
| a4 | 0.636 | -3h |
| a5 | 0.881 | -4h |
| a6 | 0.930 | -3h |
| a7 | 0.961 | -2h |
| a8 | 0.984 | -h |
| a9 | 1.000 | 0 |

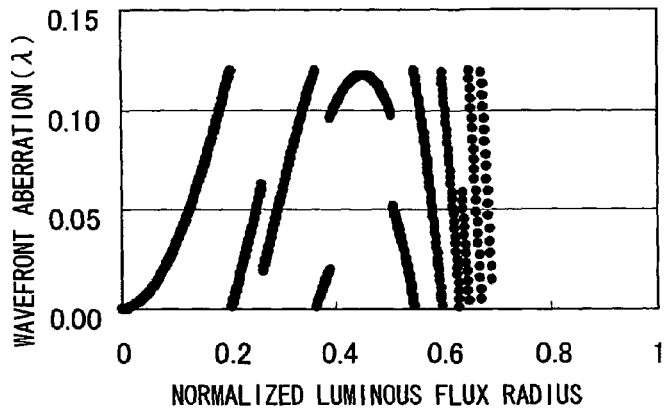

Fig. 14

FIRST EMBODIMENT  HD-DVD (BLUE; 405nm)
OBJECTIVE LENS FOCAL LENGTH 3.102mm  NA 0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 2.2 | PLASTIC OR EQUIVALENT | 1.520148 | — |
| 4 | LENS SURFACE; IMAGE SURFACE SIDE | ASPHERICAL SURFACE | 1.53813 | AIR | 1 | — |
| 5 | DISK SURFACE; OBJECT SIDE | ∞ | 0.6 | PC | 1.6235 | — |
| 6 | DISK INFORMATION RECORDING SURFACE | ∞ | — | — | — | — |

Fig. 15

FIRST EMBODIMENT DVD (655nm)

OBJECTIVE LENS FOCAL LENGTH 3.205mm  NA 0.629

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 2.2 | PLASTIC OR EQUIVALENT | 1.502116 | — |
| 4 | LENS SURFACE; IMAGE SURFACE SIDE | ASPHERICAL SURFACE | 1.630125 | AIR | 1 | — |
| 5 | DISK SURFACE; OBJECT SIDE | ∞ | 0.6 | PC | 1.58 | — |
| 6 | DISK INFORMATION RECORDING SURFACE | ∞ | — | — | — | — |

Fig. 16

FIRST EMBODIMENT CD (790nm)

OBJECTIVE LENS FOCAL LENGTH 3.226mm  NA 0.470

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | 49.8 | AIR | 1 | — |
| 2 | APERTURE SURFACE | ∞ | 0 | AIR | 1 | 3.163 |
| 3 | LENS SURFACE; OBJECT SIDE | ASPHERICAL SURFACE | 2.2 | PLASTIC OR EQUIVALENT | 1.498584 | — |
| 4 | LENS SURFACE; IMAGE SURFACE SIDE | ASPHERICAL SURFACE | 1.480416 | AIR | 1 | — |
| 5 | DISK SURFACE; OBJECT SIDE | ∞ | 1.2 | PC | 1.57163 | — |
| 6 | DISK INFORMATION RECORDING SURFACE | ∞ | — | — | — | — |

Fig. 17

OBJECT SURFACE SIDE: ZONE j = 1 TO 6

| ZONE j | | | | | | | | |
|---|---|---|---|---|---|---|---|---|
| 1<br>HD-DVD<br>/DVD<br>COMMON<br>USE AREA | R | 1.961164E+00 | C | 5.099013E-01 | K | -7.171994E-01 | | |
| | A4 | 5.941686E-03 | A6 | -2.952150E-04 | A8 | 1.747287E-04 | A10 | -7.075881E-05 |
| | A12 | 2.280891E-05 | A14 | -6.748199E-06 | A16 | 7.906353E-07 | | |
| | | | B | 0 | | | | |
| | | AREA RANGE | SMALL | 0 | | | | |
| | | | LARGE | 0.527983005 | | | | |
| 2<br>HD-DVD<br>/DVD<br>COMMON<br>USE AREA | R | 1.961666E+00 | C | 5.097707E-01 | K | -6.879136E-01 | | |
| | A4 | 5.452389E-03 | A6 | -3.330526E-04 | A8 | 1.726828E-04 | A10 | -7.137150E-05 |
| | A12 | 2.292024E-05 | A14 | -6.758406E-06 | A16 | 7.895848E-07 | | |
| | | | B | -0.001462789 | | | | |
| | | AREA RANGE | SMALL | 0.527983005 | | | | |
| | | | LARGE | 0.786831561 | | | | |
| 3<br>HD-DVD<br>/DVD<br>COMMON<br>USE AREA | R | 1.962167E+00 | C | 5.096406E-01 | K | -6.900110E-01 | | |
| | A4 | 5.482011E-03 | A6 | -3.282861E-04 | A8 | 1.713408E-04 | A10 | -7.059930E-05 |
| | A12 | 2.271048E-05 | A14 | -6.717899E-06 | A16 | 7.857438E-07 | | |
| | | | B | -0.002924152 | | | | |
| | | AREA RANGE | SMALL | 0.786831561 | | | | |
| | | | LARGE | 1.024862323 | | | | |
| 4<br>HD-DVD<br>/DVD<br>COMMON<br>USE AREA | R | 1.962670E+00 | C | 5.095100E-01 | K | -6.839427E-01 | | |
| | A4 | 5.378139E-03 | A6 | -3.376053E-04 | A8 | 1.721947E-04 | A10 | -7.146818E-05 |
| | A12 | 2.294799E-05 | A14 | -6.744784E-06 | A16 | 7.858748E-07 | | |
| | | | B | -0.004386257 | | | | |
| | | AREA RANGE | SMALL | 1.024862323 | | | | |
| | | | LARGE | 1.289234974 | | | | |
| 5<br>HD-DVD<br>/DVD<br>COMMON<br>USE AREA | R | 1.963172E+00 | C | 5.093797E-01 | K | -6.955049E-01 | | |
| | A4 | 5.565035E-03 | A6 | -3.221594E-04 | A8 | 1.737197E-04 | A10 | -7.165584E-05 |
| | A12 | 2.304752E-05 | A14 | -6.750307E-06 | A16 | 7.849629E-07 | | |
| | | | B | -0.005847419 | | | | |
| | | AREA RANGE | SMALL | 1.289234974 | | | | |
| | | | LARGE | 1.772263788 | | | | |
| 6<br>HD-DVD<br>/DVD<br>COMMON<br>USE AREA | R | 1.962669E+00 | C | 5.095103E-01 | K | -6.942346E-01 | | |
| | A4 | 5.548337E-03 | A6 | -3.239672E-04 | A8 | 1.733603E-04 | A10 | -7.147108E-05 |
| | A12 | 2.298161E-05 | A14 | -6.749231E-06 | A16 | 7.862807E-07 | | |
| | | | B | -0.004389635 | | | | |
| | | AREA RANGE | SMALL | 1.772263788 | | | | |
| | | | LARGE | 1.874431068 | | | | |

Fig. 18

OBJECT SURFACE SIDE: ZONE j = 7 TO 10

| ZONE j | | | | | | | | |
|---|---|---|---|---|---|---|---|---|
| 7<br>HD-DVD<br>/DVD<br>COMMON<br>USE AREA | R | 1.962167E+00 | C | 5.096407E-01 | K | -6.897721E-01 | | |
| | A4 | 5.478682E-03 | A6 | -3.298444E-04 | A8 | 1.725296E-04 | A10 | -7.123807E-05 |
| | A12 | 2.289436E-05 | A14 | -6.745462E-06 | A16 | 7.874131E-07 | | |
| | | | B | -0.002928338 | | | | |
| | | AREA RANGE | SMALL | 1.874431068 | | | | |
| | | | LARGE | 1.936558244 | | | | |
| 8<br>HD-DVD<br>EXCLUSIVE<br>USE AREA | R | 1.961664E+00 | C | 5.097712E-01 | K | -7.036127E-01 | | |
| | A4 | 5.711363E-03 | A6 | -3.105361E-04 | A8 | 1.723249E-04 | A10 | -7.029008E-05 |
| | A12 | 2.265427E-05 | A14 | -6.717740E-06 | A16 | 7.873065E-07 | | |
| | | | B | -0.001463602 | | | | |
| | | AREA RANGE | SMALL | 1.936558244 | | | | |
| | | | LARGE | 1.983164721 | | | | |
| 9<br>HD-DVD<br>EXCLUSIVE<br>USE AREA | R | 1.961162E+00 | C | 5.099017E-01 | K | -6.905755E-01 | | |
| | A4 | 5.500499E-03 | A6 | -3.291831E-04 | A8 | 1.722634E-04 | A10 | -7.092133E-05 |
| | A12 | 2.278891E-05 | A14 | -6.747295E-06 | A16 | 7.903575E-07 | | |
| | | | B | 7.87111E-07 | | | | |
| | | AREA RANGE | SMALL | 1.983164721 | | | | |
| | | | LARGE | 2.016 | | | | |

Fig. 19

IMAGE SURFACE SIDE

| | | | | | | | | |
|---|---|---|---|---|---|---|---|---|
| R2 | R | -5.608087E+00 | C | -1.783139E-01 | K | -5.506429E+01 | | |
| | A4 | 4.689891E-03 | A6 | -2.015207E-03 | A8 | -1.091107E-04 | A10 | 1.343906E-04 |
| | A12 | 7.694800E-06 | A14 | -8.013337E-06 | A16 | 8.706881E-07 | | |
| | | | B | 0 | | | | |
| | | AREA RANGE | SMALL | 0 | | | | |
| | | | LARGE | 1.675852 | | | | |

Fig. 20

DIFFERENCE IN OPTICAL PATH LENGTH (λ)
BETWEEN ZONE 1 AND ZONE 2 TO 9

| ZONE j | OPTICAL PATH LENGTH DIFFERENCE FROM ZONE 1 | | |
|---|---|---|---|
| | WAVELENGTH 405nm, HD-DVD | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 6 | 3 | − |
| 7 | 4 | 2 | − |
| 8 | 2 | 1 | − |
| 9 | 0 | 0 | − |

$r^2 = x^2 + y^2$

THIRD EMBODIMENT HD-DVD (BLUE; 408nm)
OBJECTIVE LENS FOCAL LENGTH 2.3721mm NA 0.850

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 2.642 | GLASS OR EQUIVALENT | 1.5126 | — |
| 4 | LENS SURFACE; IMAGE SURFACE SIDE | ASPHERICAL SURFACE | 0.8867 | AIR | 1 | — |
| 5 | DISK SURFACE; OBJECT SIDE | ∞ | 0.0875 | PC | 1.6205 | — |
| 6 | DISK INFORMATION RECORDING SURFACE | ∞ | — | — | — | — |

Fig. 23A

THIRD EMBODIMENT DVD (655nm)
OBJECTIVE LENS FOCAL LENGTH 2.4262mm NA 0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.153 |
| 3 | LENS SURFACE; OBJECT SIDE | ASPHERICAL SURFACE | 2.642 | GLASS OR EQUIVALENT | 1.4987 | — |
| 4 | LENS SURFACE; IMAGE SURFACE SIDE | ASPHERICAL SURFACE | 0.60873 | AIR | 1 | — |
| 5 | DISK SURFACE; OBJECT SIDE | ∞ | 0.6 | PC | 1.5794 | — |
| 6 | DISK INFORMATION RECORDING SURFACE | ∞ | — | — | — | — |

Fig. 23B

THIRD EMBODIMENT CD (790nm)

OBJECTIVE LENS FOCAL LENGTH 2.4378mm NA 0.510

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | 19.35 | AIR | 1 | — |
| 2 | APERTURE SURFACE | ∞ | 0 | AIR | 1 | 2.794 |
| 3 | LENS SURFACE; OBJECT SIDE | ASPHERICAL SURFACE | 2.642 | GLASS OR EQUIVALENT | 1.4958 | — |
| 4 | LENS SURFACE; IMAGE SURFACE SIDE | ASPHERICAL SURFACE | 0.5557 | AIR | 1 | — |
| 5 | DISK SURFACE; OBJECT SIDE | ∞ | 1.2 | PC | 1.5725 | — |
| 6 | DISK INFORMATION RECORDING SURFACE | ∞ | — | — | — | — |

Fig. 23C

OBJECT SURFACE SIDE: ZONE j = 1 TO 6

| ZONE j | | | | | | | | |
|---|---|---|---|---|---|---|---|---|
| 1 BLU-RAY /DVD COMMON USE AREA | R | 1.483996664 | C | 0.673855962 | K | -16.3972459 | | |
| | A4 | 0.094660411 | A6 | 39.11539292 | A8 | -1505.37515 | A10 | 26018.3113 |
| | A12 | -170114.543 | A14 | 2.252424464 | A16 | 0.287207077 | | |
| | | | B | 0 | | | | |
| | RANGE OF h | | SMALL | 0 | | | | |
| | | | LARGE | 0.21762238 | | | | |
| 2 BLU-RAY /DVD COMMON USE AREA | R | 1.53567174 | C | 0.651180831 | K | -6.65802029 | | |
| | A4 | 0.817293994 | A6 | -9.14557483 | A8 | -17.2690536 | A10 | 979.9972387 |
| | A12 | 2483.17142 | A14 | -118851.816 | A16 | 524155.6559 | | |
| | | | B | -0.0015919 | | | | |
| | RANGE OF h | | SMALL | 0.21762238 | | | | |
| | | | LARGE | 0.31022235 | | | | |
| 3 BLU-RAY /DVD COMMON USE AREA | R | 1.599112109 | C | 0.625347025 | K | 1.433878527 | | |
| | A4 | 0.396330904 | A6 | -0.63776774 | A8 | -18.796398 | A10 | -54.5171068 |
| | A12 | 636.3429712 | A14 | 5925.017186 | A16 | -32751.9962 | | |
| | | | B | -0.00318377 | | | | |
| | RANGE OF h | | SMALL | 0.31022235 | | | | |
| | | | LARGE | 0.3829029 | | | | |
| 4 BLU-RAY /DVD COMMON USE AREA | R | 1.434551701 | C | 0.697081882 | K | -7.52479429 | | |
| | A4 | 0.085767596 | A6 | 0.423482479 | A8 | 2.603767797 | A10 | -3.81841 |
| | A12 | -69.3580366 | A14 | -133.809602 | A16 | 1225.44831 | | |
| | | | B | -0.00477565 | | | | |
| | RANGE OF h | | SMALL | 0.3829029 | | | | |
| | | | LARGE | 0.44551105 | | | | |
| 5 BLU-RAY /DVD COMMON USE AREA | R | 1.23702856 | C | 0.808388773 | K | -13.8934328 | | |
| | A4 | -0.04197071 | A6 | 0.627402525 | A8 | 3.888321541 | A10 | 5.882855892 |
| | A12 | -59.9644373 | A14 | -237.861474 | A16 | 855.430159 | | |
| | | | B | -0.00636754 | | | | |
| | RANGE OF h | | SMALL | 0.44551105 | | | | |
| | | | LARGE | 0.50184088 | | | | |
| 6 BLU-RAY /DVD COMMON USE AREA | R | 1.166760899 | C | 0.857073631 | K | -12.1244823 | | |
| | A4 | -0.07888418 | A6 | 0.308580202 | A8 | 2.682470381 | A10 | 4.183538737 |
| | A12 | -19.9011704 | A14 | -99.0700446 | A16 | 237.2207005 | | |
| | | | B | -0.00795942 | | | | |
| | RANGE OF h | | SMALL | 0.50184088 | | | | |
| | | | LARGE | 0.55384699 | | | | |

Fig. 24

OBJECT SURFACE SIDE: ZONE j = 7 TO 12

| ZONE j | | | | | | | | |
|---|---|---|---|---|---|---|---|---|
| 7 BLU-RAY /DVD COMMON USE AREA | R | 1.244427233 | C | 0.803582542 | K | -8.08545341 | | |
| | A4 | -0.02845717 | A6 | 0.108380327 | A8 | 1.076913034 | A10 | 1.964356292 |
| | A12 | -3.75981137 | A14 | -31.8120777 | A16 | 53.25002802 | | |
| | | | B | -0.00955131 | | | | |
| | RANGE OF h | | SMALL | 0.55384699 | | | | |
| | | | LARGE | 0.60271631 | | | | |
| 8 BLU-RAY /DVD COMMON USE AREA | R | 1.327355868 | C | 0.753377466 | K | -5.19465131 | | |
| | A4 | 0.010760779 | A6 | 0.039032865 | A8 | 0.364424321 | A10 | 0.240003296 |
| | A12 | 0.481545028 | A14 | -6.16830235 | A16 | 5.8148765 | | |
| | | | B | -0.01114319 | | | | |
| | RANGE OF h | | SMALL | 0.60271631 | | | | |
| | | | LARGE | 0.64925904 | | | | |
| 9 BLU-RAY /DVD COMMON USE AREA | R | 1.409106927 | C | 0.709669352 | K | -2.38637377 | | |
| | A4 | 0.027844963 | A6 | -0.04544383 | A8 | -0.01694078 | A10 | 0.15663804 |
| | A12 | 0.5162377 | A14 | 0.721501213 | A16 | -2.66990743 | | |
| | | | B | -0.01273508 | | | | |
| | RANGE OF h | | SMALL | 0.64925904 | | | | |
| | | | LARGE | 0.69409466 | | | | |
| 10 BLU-RAY /DVD COMMON USE AREA | R | 1.338005001 | C | 0.747381362 | K | -3.56445559 | | |
| | A4 | 0.014468192 | A6 | -0.0220885 | A8 | 0.097664239 | A10 | 0.263425333 |
| | A12 | 0.030096219 | A14 | -0.66685014 | A16 | 0.110657132 | | |
| | | | B | -0.01432696 | | | | |
| | RANGE OF h | | SMALL | 0.69409466 | | | | |
| | | | LARGE | 0.73773231 | | | | |
| 11 BLU-RAY /DVD COMMON USE AREA | R | 1.348930249 | C | 0.741328175 | K | 1.348930249 | | |
| | A4 | 0.019832778 | A6 | -0.03230534 | A8 | 0.023369232 | A10 | 0.12517188 |
| | A12 | 0.188638209 | A14 | -0.1012241 | A16 | -0.34477055 | | |
| | | | B | -0.01591885 | | | | |
| | RANGE OF h | | SMALL | 0.73773231 | | | | |
| | | | LARGE | 0.7806433 | | | | |
| 12 BLU-RAY /DVD COMMON USE AREA | R | 1.300111546 | C | 0.769164771 | K | -2.6569841 | | |
| | A4 | 0.012719799 | A6 | -0.06037886 | A8 | -0.02185226 | A10 | 0.097939601 |
| | A12 | 0.252933148 | A14 | 0.208391643 | A16 | -0.58404278 | | |
| | | | B | -0.01751073 | | | | |
| | RANGE OF h | | SMALL | 0.7806433 | | | | |
| | | | LARGE | 0.82330839 | | | | |

Fig. 25

OBJECT SURFACE SIDE: ZONE j = 13 TO 18

| ZONE j | | | | | | | | | |
|---|---|---|---|---|---|---|---|---|---|
| 13 BLU-RAY /DVD COMMON USE AREA | R | 1.419047629 | C | 0.704697982 | K | -2.08105117 | | | |
| | A4 | 0.03516193 | A6 | -0.01799753 | A8 | -0.00592847 | A10 | 0.022874187 | |
| | A12 | 0.055942122 | A14 | 0.043145862 | A16 | -0.10882687 | | | |
| | | | B | -0.01910261 | | | | | |
| | | RANGE OF h | SMALL | 0.82330839 | | | | | |
| | | | LARGE | 0.86626825 | | | | | |
| 14 BLU-RAY /DVD COMMON USE AREA | R | 1.546115933 | C | 0.646782029 | K | -1.50835739 | | | |
| | A4 | 0.052135072 | A6 | 0.010960979 | A8 | 0.003664849 | A10 | -0.01231273 | |
| | A12 | -0.02675421 | A14 | -0.01946868 | A16 | 0.041244308 | | | |
| | | | B | -0.0206945 | | | | | |
| | | RANGE OF h | SMALL | 0.86626825 | | | | | |
| | | | LARGE | 0.91020224 | | | | | |
| 15 BLU-RAY /DVD COMMON USE AREA | R | 1.555431411 | C | 0.642908452 | K | -1.51093094 | | | |
| | A4 | 0.052553858 | A6 | 0.010222417 | A8 | 0.003114724 | A10 | -0.00934616 | |
| | A12 | -0.01836561 | A14 | -0.01186149 | A16 | 0.023019799 | | | |
| | | | B | -0.02228638 | | | | | |
| | | RANGE OF h | SMALL | 0.91020224 | | | | | |
| | | | LARGE | 0.95608451 | | | | | |
| 16 BLU-RAY /DVD COMMON USE AREA | R | 1.548209197 | C | 0.645907544 | K | -1.557899 | | | |
| | A4 | 0.050747145 | A6 | 0.007188213 | A8 | 0.001961623 | A10 | -0.00530843 | |
| | A12 | -0.00949987 | A14 | -0.00632247 | A16 | 0.010317907 | | | |
| | | | B | -0.0238783 | | | | | |
| | | RANGE OF h | SMALL | 0.95608451 | | | | | |
| | | | LARGE | 1.00552917 | | | | | |
| 17 BLU-RAY /DVD COMMON USE AREA | R | 1.544630001 | C | 0.647404232 | K | -1.587942 | | | |
| | A4 | 0.049769271 | A6 | 0.005181299 | A8 | 0.001120656 | A10 | -0.003307781 | |
| | A12 | -0.00510844 | A14 | -0.0029516 | A16 | 0.004507299 | | | |
| | | | B | -0.02547015 | | | | | |
| | | RANGE OF h | SMALL | 1.00552917 | | | | | |
| | | | LARGE | 1.061859 | | | | | |
| 18 BLU-RAY /DVD COMMON USE AREA | R | 1.580184659 | C | 0.632837431 | K | -1.19506424 | | | |
| | A4 | 0.052025599 | A6 | -0.00032127 | A8 | -0.00515099 | A10 | -0.00463934 | |
| | A12 | 0.000134763 | A14 | 0.002926451 | A16 | -0.00064826 | | | |
| | | | B | -0.02706204 | | | | | |
| | | RANGE OF h | SMALL | 1.061859 | | | | | |
| | | | LARGE | 1.13567132 | | | | | |

Fig. 26

OBJECT SURFACE SIDE: ZONE j = 19 TO 24

| ZONE j | | | | | | | | |
|---|---|---|---|---|---|---|---|---|
| 19 BLU-RAY /DVD COMMON USE AREA | R | 1.555954904 | C | 0.642692148 | K | -1.34639801 | | |
| | A4 | 0.050919564 | A6 | -0.00350483 | A8 | -0.00416339 | A10 | -0.00096262 |
| | A12 | 0.001201134 | A14 | 0.000745264 | A16 | -0.00036526 | | |
| | | | B | -0.02865392 | | | | |
| | | RANGE OF h | SMALL | 1.13567132 | | | | |
| | | | LARGE | 1.33034626 | | | | |
| 20 BLU-RAY /DVD COMMON USE AREA | R | 1.44416631 | C | 0.692441025 | K | -1.80761473 | | |
| | A4 | 0.042529601 | A6 | -0.00258023 | A8 | -0.00093988 | A10 | 0.000261275 |
| | A12 | 0.000673281 | A14 | 0.000111189 | A16 | -0.00013072 | | |
| | | | B | -0.02706204 | | | | |
| | | RANGE OF h | SMALL | 1.33034626 | | | | |
| | | | LARGE | 1.38585801 | | | | |
| 21 BLU-RAY /DVD COMMON USE AREA | R | 1.49455004 | C | 0.669097704 | K | -1.76648975 | | |
| | A4 | 0.045003624 | A6 | -0.00045278 | A8 | -0.000255 | A10 | 2.25736E-05 |
| | A12 | 0.00024333 | A14 | -87995E-05 | A16 | 5.22662E-06 | | |
| | | | B | -0.02547015 | | | | |
| | | RANGE OF h | SMALL | 1.38585801 | | | | |
| | | | LARGE | 1.42287845 | | | | |
| 22 BLU-RAY /DVD COMMON USE AREA | R | 1.566237953 | C | 0.638472588 | K | -1.66992176 | | |
| | A4 | 0.048479042 | A6 | 0.001490439 | A8 | -2.1408E-05 | A10 | -0.00028489 |
| | A12 | -2.1435E-05 | A14 | -0.00016441 | A16 | 7.00167E-05 | | |
| | | | B | -0.02387827 | | | | |
| | | RANGE OF h | SMALL | 1.42287845 | | | | |
| | | | LARGE | 1.45193712 | | | | |
| 23 BLU-RAY /DVD COMMON USE AREA | R | 1.647620951 | C | 0.606935715 | K | -1.58171714 | | |
| | A4 | 0.052010933 | A6 | 0.003244997 | A8 | 0.000258507 | A10 | -0.00051211 |
| | A12 | -0.00019464 | A14 | -0.0002237 | A16 | 0.000107794 | | |
| | | | B | -0.02228638 | | | | |
| | | RANGE OF h | SMALL | 1.45193712 | | | | |
| | | | LARGE | 1.47627483 | | | | |
| 24 BLU-RAY /DVD COMMON USE AREA | R | 1.575125725 | C | 0.634869956 | K | -1.65403728 | | |
| | A4 | 0.049162687 | A6 | 0.001405863 | A8 | -0.00010388 | A10 | -0.00027842 |
| | A12 | 6.52617E-06 | A14 | -0.00015409 | A16 | 6.11741E-05 | | |
| | | | B | -0.0206945 | | | | |
| | | RANGE OF h | SMALL | 1.47627483 | | | | |
| | | | LARGE | 1.49740483 | | | | |

Fig. 27

OBJECT SURFACE SIDE: ZONE j = 25 TO 29

| ZONE j | | | | | | | | |
|---|---|---|---|---|---|---|---|---|
| 25 BLU-RAY /DVD COMMON USE AREA | R | 1.479508128 | C | 0.675900308 | K | -1.76273653 | | |
| | A4 | 0.04538464 | A6 | -0.00073096 | A8 | -0.00041136 | A10 | -3.5704E-05 |
| | A12 | 0.000224223 | A14 | -8.5864E-05 | A16 | 1.51987E-05 | | |
| | | | B | -0.01910261 | | | | |
| | RANGE OF h | | SMALL | 1.49740483 | | | | |
| | | | LARGE | 1.51618144 | | | | |
| 26 BLU-RAY /DVD COMMON USE AREA | R | 1.552307326 | C | 0.644202332 | K | -1.69655271 | | |
| | A4 | 0.048007259 | A6 | 0.000678304 | A8 | -0.00015887 | A10 | -0.00013321 |
| | A12 | 0.000117908 | A14 | -0.00012678 | A16 | 3.42952E-05 | | |
| | | | B | -0.01751073 | | | | |
| | RANGE OF h | | SMALL | 1.51618144 | | | | |
| | | | LARGE | 1.5331406 | | | | |
| 27 BLU-RAY /DVD COMMON USE AREA | R | 1.596231378 | C | 0.626475594 | K | -1.65825971 | | |
| | A4 | 0.049354083 | A6 | 0.001377076 | A8 | -3.2511E-05 | A10 | -0.0001617 |
| | A12 | 7.20323E-05 | A14 | -0.0001368 | A16 | 3.84509E-05 | | |
| | | | B | -0.01591885 | | | | |
| | RANGE OF h | | SMALL | 1.5331406 | | | | |
| | | | LARGE | 1.54864802 | | | | |
| 28 BLU-RAY /DVD COMMON USE AREA | R | 1.548556394 | C | 0.645762727 | K | -1.71865614 | | |
| | A4 | 0.047508066 | A6 | 0.000450203 | A8 | -0.0001415 | A10 | -5.7179E-05 |
| | A12 | 0.000165962 | A14 | -0.00011379 | A16 | 2.16564E-05 | | |
| | | | B | -0.01432696 | | | | |
| | RANGE OF h | | SMALL | 1.54864802 | | | | |
| | | | LARGE | 1.56296219 | | | | |
| 29 BLU-RAY /DVD COMMON USE AREA | R | 1.581540106 | C | 0.632295062 | K | -1.68511463 | | |
| | A4 | 0.048533047 | A6 | 0.000963999 | A8 | -6.4664E-05 | A10 | -8.9982E-05 |
| | A12 | 0.000128895 | A14 | -0.00012105 | A16 | 2.61297E-05 | | |
| | | | B | -0.01273508 | | | | |
| | RANGE OF h | | SMALL | 1.56296219 | | | | |
| | | | LARGE | 1.57627745 | | | | |

Fig. 28

OBJECT SURFACE SIDE: ZONE j = 30 TO 31

| ZONE j | | | | | | | | | |
|---|---|---|---|---|---|---|---|---|---|
| 30 BLU-RAY EXCLUSIVE USE AREA | R | 1.443125977 | C | 0.692940198 | K | -2.02113842 | | | |
| | A4 | 0.045697032 | A6 | 0.000804706 | A8 | -0.00021843 | A10 | -9.9119E-05 | |
| | A12 | 0.000217028 | A14 | -7.8061E-05 | A16 | 8.11143E-06 | | | |
| | | | B | -0.0111852 | | | | | |
| | | RANGE OF h | SMALL | 1.57627745 | | | | | |
| | | | LARGE | 1.779083 | | | | | |
| 31 BLU-RAY EXCLUSIVE USE AREA | R | 1.440992543 | C | 0.693966117 | K | -2.0128819 | | | |
| | A4 | 0.045497326 | A6 | 0.000855015 | A8 | -0.0001979 | A10 | -0.0001015 | |
| | A12 | 0.000215442 | A14 | -7.7924E-05 | A16 | 8.13734E-06 | | | |
| | | | B | -0.00640955 | | | | | |
| | | RANGE OF h | SMALL | 1.779083 | | | | | |
| | | | LARGE | 2.016 | | | | | |

Fig. 29

IMAGE SURFACE SIDE

| | R | -2.66955809 | C | -0.37459383 | K | -20.6486848 | | |
|---|---|---|---|---|---|---|---|---|
| | A4 | 0.068007176 | A6 | -0.06053298 | A8 | 0.029587666 | A10 | -0.00861265 |
| R2 | A12 | 0.001454018 | A14 | -0.00012305 | A16 | 3.35E-06 | | |
| | | | B | 2.642468 | | | | |
| | | RANGE OF h | SMALL | 0 | | | | |
| | | | LARGE | 1.6473 | | | | |

Fig. 30

DIFFERENCE IN OPTICAL PATH LENGTH (λ) BETWEEN ZONE 1 AND ZONE 2 TO 31

| ZONE j | OPTICAL PATH LENGTH DIFFERENCE FROM ZONE 1 | | |
|---|---|---|---|
| | WAVELENGTH 405nm, BLU-RAY | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 10 | 5 | 5 |
| 7 | 12 | 6 | 6 |
| 8 | 14 | 7 | 7 |
| 9 | 16 | 8 | 8 |
| 10 | 18 | 9 | 9 |
| 11 | 20 | 10 | 10 |
| 12 | 22 | 11 | 11 |
| 13 | 24 | 12 | 12 |
| 14 | 26 | 13 | 13 |
| 15 | 28 | 14 | 14 |
| 16 | 30 | 15 | 15 |
| 17 | 32 | 16 | 16 |
| 18 | 34 | 17 | 17 |
| 19 | 36 | 18 | 18 |
| 20 | 34 | 17 | 17 |
| 21 | 32 | 16 | 16 |
| 22 | 30 | 15 | 15 |
| 23 | 28 | 14 | — |
| 24 | 26 | 13 | — |
| 25 | 24 | 12 | — |
| 26 | 22 | 11 | — |
| 27 | 20 | 10 | — |
| 28 | 18 | 9 | — |
| 29 | 16 | 8 | — |
| 30 | 14 | — | — |
| 31 | 8 | — | — |

Fig. 31

OPTICAL PICKUP LENS AND OPTICAL PICKUP APPARATUS

BACKGROUND OF THE INVENTION

1. Field of the Invention

The present invention relates to an optical pickup lens and an optical pickup apparatus used for a recording and reproduction apparatus of an optical disc. More particularly, the present invention relates to an optical pickup lens and an optical pick up apparatus which is used for a compatible optical disc apparatus compatible with different types of optical discs such as Compact Disc (CD) including CD-R, Digital Versatile Disc (DVD), Blu-ray and High-Definition DVD (HD-DVD).

2. Description of Related Art

Compatible optical disc apparatus capable of recording or reproducing different types of optical discs such as CD and DVD in one system have been proposed.

In order to record or reproduce information signals stored on media such as CD and DVD (which are hereinafter collectively called the "optical disc"), the compatible optical disc apparatus needs to focus a laser beam from a light source on an information recording surface of each optical disc through a transparent substrate. However, the wavelength differs between a laser beam used for recording or reproducing CD and a laser beam used for recording or reproducing DVD. Further, the thickness of a transparent substrate also differs between CD and DVD; specifically, CD having a transparent substrate of 1.2 mm while DVD having a transparent substrate of 0.6 mm. Thus, if an optical pickup lens which has been used for focusing a laser beam on an information recording surface of each optical disc through a transparent substrate is used in common for CD and DVD in the compatible optical disc apparatus, it is unable to focus the laser beams used for CD and DVD close to the diffraction limit respectively on the information recording surface of the corresponding optical discs due to aberrations caused by these differences.

Recently, an optical disc apparatus compatible with optical discs capable of ultra high-density recording, such as Blu-ray and HD-DVD, has been proposed. Future compatible optical disc apparatus are expected to be capable of recording or reproducing not only CD and DVD but also optical discs allowing ultra high density recording. Thus, though a conventional compatible optical disc apparatus allows for two different light source wavelengths and two different thicknesses of transparent substrates, a future compatible optical disc apparatus needs to allow for at most three different light source wavelengths and at most three different thicknesses of transparent substrates.

An approach to meet the need for compatibility with at most three different light source wavelengths and at most three different thicknesses of transparent substrates is to provide an optical disc apparatus with a plurality of optical pickup lenses that prevent the occurrence of aberration for different types of optical discs and replace the optical pickup lenses in accordance with the type of the optical disc in use. Another approach is to use a plurality of optical pickup apparatus for different types of optical discs and replace the optical pickup apparatus in accordance with the type of the optical disc in use. However, in terms of cost and size reduction, it is preferred to use the same lens for any type of optical discs.

An example of an optical pickup lens compatible with a plurality of types of optical discs is disclosed in Japanese Unexamined Patent Application Publication No. 11-287948. This optical pickup lens can suppress the aberration which occurs when reproducing CD without substantially sacrificing the reproducing characteristics when reproducing DVD by forming a plurality of steps of loop zonal recess and raised portions, thus being compatible with two types of optical discs (DVD and CD) with one condenser lens. In this optical pickup lens, the depth or height (which is referred to herein as the "step height") h of the loop zonal recess or raised portion is set so that a difference in optical path length between the part without the loop zonal recess or raised portion and the part with the loop zonal recess or raised portion is substantially an integral multiple of the wavelength for DVD. Specifically, a unit step height h of the loop zonal recess or raised portion is expressed as $h \sim m*\lambda 1/(n1-1)$ where m represents a natural number, $\lambda 1$ is a light source wavelength for DVD, and n1 represents a refractive index of an optical pickup lens.

Since the above optical pickup lens can record or reproduce a plurality of types of optical discs, it eliminates the need for a unit to replace optical pickup lenses or optical pickup apparatus for each optical disc, thus enabling cost reduction and structure simplification.

However, the optical pickup lens disclosed in the above-mentioned Japanese Unexamined Patent Application Publication No. 11-287948 has two drawbacks. First, this optical pickup lens has a plurality of steps of loop zonal recess and raised portions formed on its surface in order to reduce wavefront aberration for DVD and CD and thereby achieves sufficient reduction of wavefront aberration for DVD; however, it cannot necessarily achieve practically sufficient reduction of wavefront aberration for CD.

Second, this optical pickup lens is designed only in light of DVD and CD, and not in light of optical discs compatible with ultra high-density recording, such as Blu-ray and HD-DVD, which have been developed recently. It is a significant issue for future compatible optical disc apparatus to be capable of not only recording or reproduction of DVD and CD but also recording or reproduction of optical discs compatible with ultra high-density recording, such as Blu-ray and HD-DVD.

The present invention has been accomplished to solve the above drawbacks and an object of the present invention is thus to provide an optical pickup lens and an optical pickup apparatus which can exert the effect of practical and sufficient reduction in wavefront aberration for at least three types of optical discs. More specifically, the object of the present invention is to provide an optical pickup lens and an optical pickup apparatus which enable the practical and sufficient reduction in wavefront aberration for both DVD and CD and which are compatible with optical discs for ultra high-density recording such as Blu-ray and HD-DVD.

SUMMARY OF THE INVENTION

According to one aspect of the present invention, there is provided an optical pickup lens that focuses laser beams having different wavelengths $\lambda 1$, $\lambda 2$ and $\lambda 3$ on at least three kinds of optical discs, comprising a concentric loop zonal structure formed on at least one side of the optical pickup lens, for compensating wavefront aberration occurring when recording or reproducing an optical disc having a substrate thickness t1 by the laser beam having the wavelength $\lambda 1$ and wavefront aberration occurring when recording or reproducing an optical disc having a substrate thickness t2 by the laser beam having the wavelength $\lambda 2$, the concentric loop zonal structure causing a phase difference of about $0.15\lambda$ or smaller to the laser beam having the wavelength $\lambda 3$ when recording or reproducing an optical disc having a substrate thickness t3 by the laser beam having the wavelength $\lambda 3$.

In the optical pickup lens, the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 may have substantially the same absolute values and opposite positive/negative signs.

In the optical pickup lens, the wavelength λ1 may be longest, the wavelengths λ2 may be second-longest, and the wavelength λ3 may be shortest.

In the optical pickup lens, the laser beam having the wavelength λ1 and the laser beam having the wavelength λ2 incident on the optical pickup lens may be infinite system and the laser beam having the wavelength λ3 incident on the optical pickup lens may be finite system.

In the optical pickup lens, the wavelength λ1 may be about 405 nm, the wavelength λ2 may be about 650 nm, the wavelength λ3 may be about 790 nm, the substrate thickness t1 may be about 0.1 mm, the substrate thickness t2 may be about 0.6 mm, and the substrate thickness t3 may be about 1.2 mm.

In the optical pickup lens, the wavelength λ1 may be about 405 nm, the wavelength λ2 may be about 650 nm, the wavelength λ3 may be about 790 nm, the substrate thickness t1 may be about 0.6 mm, the substrate thickness t2 may be about 0.6 mm, and the substrate thickness t3 may be about 1.2 mm.

In the optical pickup lens, the laser beam having the wavelength λ1 and the laser beam having the wavelength λ2 may be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$.

In the optical pickup lens, an RMS wavefront aberration caused by the laser beam having the wavelength λ1 and an RMS wavefront aberration caused by the laser beam having the wavelength λ2 which pass through the concentric loop zonal structure may be both 0.040λ or smaller.

According to another aspect of the present invention, there is provided an optical pickup lens that focuses laser beams having different wavelengths λ1, λ2 and λ3 on at least three kinds of optical discs, comprising a concentric loop zonal structure formed on at least one side of the optical pickup lens, the concentric loop zonal structure causing the laser beam having the wavelength λ1 and the laser beam having the wavelength λ2 to be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$, both $W_{min}$ and $W_{max}$ being 0.040λ or smaller, and the concentric loop zonal structure causing a phase difference of about 0.15λ or smaller to the laser beam having the wavelength λ3 when recording or reproducing an optical disc having a substrate thickness t3 by the laser beam having the wavelength λ3.

In the optical pickup lens, wherein the concentric loop zonal structure causes a phase difference of about 0.10λ or smaller to the laser beam having the wavelength λ3 when recording or reproducing an optical disc having a substrate thickness t3 by the laser beam having the wavelength λ3.

In the optical pickup lens, the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 may have substantially the same absolute values and opposite positive/negative signs.

In the optical pickup lens, the wavelengths λ1, λ2 and λ3 of the laser beams may satisfy: λ1<λ2<λ3.

In the optical pickup lens, the laser beam having the wavelength λ1 and the laser beam having the wavelength λ2 incident on the optical pickup lens may be infinite system and the laser beam having the wavelength λ3 incident on the optical pickup lens may be finite system.

In the optical pickup lens, the wavelength λ1 may be about 405 nm, the wavelength λ2 may be about 650 nm, the wavelength λ3 may be about 790 nm, the substrate thickness t1 may be about 0.1 mm, the substrate thickness t2 may be about 0.6 mm, and the substrate thickness t3 may be about 1.2 mm.

In the optical pickup lens, the wavelength λ1 may be about 405 nm, the wavelength λ2 may be about 650 nm, the wavelength λ3 may be about 790 nm, the substrate thickness t1 may be about 0.6 mm, the substrate thickness t2 may be about 0.6 mm, and the substrate thickness t3 may be about 1.2 mm.

In the optical pickup lens, the laser beam having the wavelength λ1 and the laser beam having the wavelength λ2 which pass through the concentric loop zonal structure may be respectively focused on the optical disc having the substrate thickness t1 and the optical disc having the substrate thickness t2 in such a way that RMS wavefront aberration may be $\{(W_1^2+W_2^2)/2\}^{1/2} \leq 0.028$ where $W_1$ is wavefront aberration for the laser beam having the wavelength λ1 and $W_2$ is wavefront aberration for the laser beam having the wavelength λ2.

According to another aspect of the present invention, there is provided an optical pickup apparatus that records or reproduces information on optical discs respectively having substrate thickness t1, t2 and t3 by laser beams having different wavelengths λ1, λ2 and λ3, comprising a light source that emits the laser beams having the wavelengths λ1, λ2 and λ3 and an optical pickup lens that receives the laser beams having the wavelengths λ1 and λ2 emitted from the light source as parallel light, receives the laser beam having the wavelength λ3 emitted from the light source as divergent light, and focuses the received laser beams onto the optical discs, at least one side of the optical pickup lens having a concentric loop zonal structure for compensating wavefront aberration occurring when recording or reproducing the optical disc having the substrate thickness t1 by the laser beam having the wavelength λ1 and wavefront aberration occurring when recording or reproducing the optical disc having the substrate thickness t2 by the laser beam having the wavelength λ2, the concentric loop zonal structure causing a phase difference of about 0.15λ or smaller to the laser beam having the wavelength λ3 when recording or reproducing the optical disc having the substrate thickness t3 by the laser beam having the wavelength λ3.

According to another aspect of the present invention, there is provided an optical pickup apparatus that records or reproduces information on optical discs respectively having substrate thickness t1, t2 and t3 by laser beams having different wavelengths λ1, λ2 and λ3, comprising a light source that emits the laser beams having the wavelengths λ1, λ2 and λ3 and an optical pickup lens that receives the laser beams having the wavelengths λ1, λ2 and λ3 emitted from the light source as parallel light and focuses the received laser beams onto the optical discs, at least one side of the optical pickup lens having a concentric loop zonal structure, the concentric loop zonal structure causing the laser beam having the wavelength λ1 and the laser beam having the wavelength λ2 to be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$, both $W_{min}$ and $W_{max}$ being 0.040λ or smaller, and the concentric loop zonal structure causing a phase difference of about 0.15λ or smaller to the laser beam having the wavelength λ3 when recording or reproducing an optical disc having a substrate thickness t3 by the laser beam having the wavelength λ3.

According to another aspect of the present invention, there is provided an optical pickup apparatus that records or reproduces information on optical discs respectively having substrate thickness t1, t2 and t3 by laser beams having different wavelengths λ1, λ2 and λ3, comprising a light source that emits the laser beams having the wavelengths λ1, λ2 and λ3, an optical pickup lens that receives the laser beams having the wavelengths λ1, λ2 and λ3 emitted from the light source as parallel light and focuses the received laser beams onto the optical discs, at least one side of the optical pickup lens having a concentric loop zonal structure for compensating wavefront aberration occurring when recording or reproducing the optical disc having the substrate thickness t1 by the laser beam having the wavelength λ1 and wavefront aberration occurring when recording or reproducing the optical disc having the substrate thickness t2 by the laser beam having the wavelength λ2 and a phase compensator formed on an optical path of the laser beam having the wavelength λ3, for adding a phase difference with a prescribed space distribution to the laser beam having the wavelength λ3, the phase compensator with the space distribution causing a phase difference of about 0.15λ or smaller to the laser beam having the wavelength λ3 when recording or reproducing the optical disc having the substrate thickness t3 by the laser beam having the wavelength λ3.

In the optical pickup apparatus, the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 may have substantially the same absolute values and opposite positive/negative signs.

In the optical pickup apparatus, the phase compensator may be formed by providing a concentric loop zonal structure on a flat plate.

In the optical pickup apparatus, the laser beam having the wavelength λ1 and the laser beam having the wavelength λ2 may be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$.

In the optical pickup apparatus, an RMS wavefront aberration caused by the laser beam having the wavelength λ1 and an RMS wavefront aberration caused by the laser beam having the wavelength λ2 which pass through the concentric loop zonal structure may be both 0.040λ or smaller.

In the optical pickup apparatus, the laser beam having the wavelength λ1 and the laser beam having the wavelength λ2 which pass through the concentric loop zonal structure may be focused respectively on the optical disc having the substrate thickness t1 and the optical disc having the substrate thickness t2 in such a way that RMS wavefront aberration is $\{(W_1^2+W_2^2)/2\}^{1/2} \leq 0.028$ where $W_1$ is wavefront aberration for the laser beam having the wavelength λ1 and $W_2$ is wavefront aberration for the laser beam having the wavelength λ2.

BRIEF DESCRIPTION OF THE DRAWING

The above and other objects, advantages and features of the present invention will be more apparent from the following description taken in conjunction with the accompanying drawings, in which:

FIG. 14 is a view showing wavefront aberration on HD-DVD, DVD and CD when using a phase compensator and an optical pickup lens according to an embodiment of the present invention;

FIG. 15 is a view showing lens data of an optical pickup lens according to an embodiment of the present invention;

FIG. 16 is a view showing lens data of an optical pickup lens according to an embodiment of the present invention;

FIG. 17 is a view showing lens data of an optical pickup lens according to an embodiment of the present invention;

FIG. 18 is a view that represents by mathematical expression the aspherical shape of an optical pickup lens according to an embodiment the present invention;

FIG. 19 is a view that represents by mathematical expression the aspherical shape of an optical pickup lens according to an embodiment the present invention;

FIG. 20 is a view that represents by mathematical expression the aspherical shape of an optical pickup lens according to an embodiment the present invention;

FIGS. 23A to 23C are views showing lens data of an optical pickup lens according to an embodiment of the present invention;

FIG. 24 is a view that represents by mathematical expression the aspherical shape of an optical pickup lens according to an embodiment the present invention;

FIG. 25 is a view that represents by mathematical expression the aspherical shape of an optical pickup lens according to an embodiment of the present invention;

FIG. 26 is a view that represents by mathematical expression the aspherical shape of an optical pickup lens according to an embodiment of the present invention;

FIG. 27 is a view that represents by mathematical expression the aspherical shape of an optical pickup lens according to an embodiment of the present invention;

FIG. 28 is a view that represents by mathematical expression the aspherical shape of an optical pickup lens according to an embodiment of the present invention;

FIG. 29 is a view that represents by mathematical expression the aspherical shape of an optical pickup lens according to an embodiment of the present invention;

FIG. 30 is a view that represents by mathematical expression the aspherical shape of an optical pickup lens according to an embodiment of the present invention;

FIG. 31 is a table showing a difference in optical path length between a common use area and an exclusive use area of an optical pickup lens according to an embodiment the present invention.

DESCRIPTION OF THE PREFERRED EMBODIMENTS

First Embodiment

Figure 1:
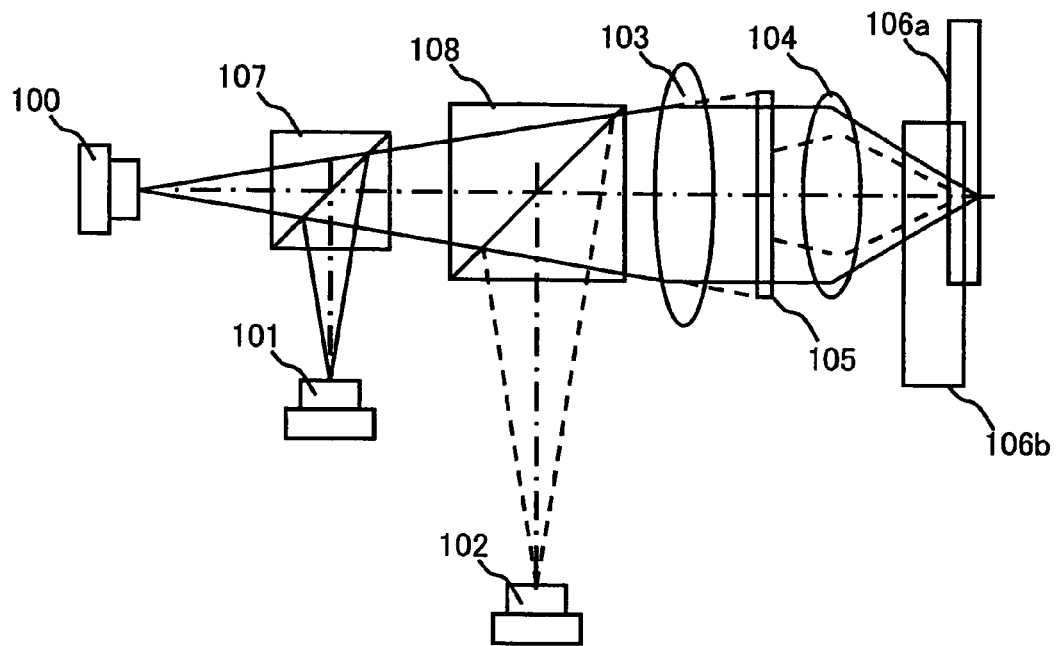
FIG. 1 is a schematic view of an optical pickup apparatus according to a first embodiment of the present invention.

FIG. 1 shows an example of an optical pickup apparatus according to a first embodiment of the present invention. The optical pickup apparatus includes a light source 100 for HD-DVD, a light source 101 for DVD, and a light source 102 for CD. The light source 100 emits a laser beam of wavelength $\lambda 1=405$ nm, the light source 101 emits a laser beam of wavelength $\lambda 2=655$ nm, and the light source 102 emits a laser beam of wavelength $\lambda 3=790$ nm.

A beam splitter 107 is disposed on the optical paths of the laser beams emitted from the light source 100 and the light source 101. The beam splitter 107 allows the laser beam emitted from the light source 100 to pass through and reflects the laser beam emitted from the light source 101 to lead those beams toward an optical disc.

A beam splitter 108 is disposed on the optical paths of the laser beam output from the beam splitter 107 and the laser beam emitted from the light source 102. The beam splitter 108 allows the laser beam output from the beam splitter 107 to pass through and reflects the laser beam emitted from the light source 102 to lead those beams toward an optical disc.

A collimator lens 103 is disposed on the optical path of the laser beam having passed through the beam splitter 108. The laser beams emitted from the light sources 101, 102 and 103 are divergent light when entering the collimator lens 103. The collimator lens 103 transforms the laser beam emitted from the light source 100 and the laser beam emitted from the light source 101 from the divergent light into substantially parallel light. The collimator lens 103 further transforms the laser beam emitted from the light source 102 so as to narrow the angle of divergence. The laser beam emitted from the light source 102 remains to be divergent after its divergence angle is changed through the collimator lens 103.

A limiting aperture 105 is disposed on the optical path of the laser beam output from the collimator lens 103. The limiting aperture 105 determines an effective numerical aperture of the optical pickup lens 104. Specifically, if an optical disc 106 is HD-DVD, the limiting aperture 105 limits the effective numerical aperture of the optical pickup lens 104 to approximately 0.65. If the optical disc 106 is DVD, the limiting aperture 105 limits the effective numerical aperture of the optical pickup lens 104 to approximately 0.60. Further, if the optical disc 106 is CD, the limiting aperture 105 limits the effective numerical aperture of the optical pickup lens 104 to approximately 0.47. A wavelength selection filter that is described in Japanese Unexamined Patent Application Publication No. 09-54977, for example, may be used as the limiting aperture 105.

The optical pickup lens 104 is disposed on the optical path of the laser beam having passed through the limiting aperture 105. The optical pickup lens 104 focuses incoming light on the information recording surface of the optical disc 106 close to the diffraction limit. The optical pickup lens 104 further leads the laser beam reflected on the information recording surface of the optical disc 106 to a detection system (not shown). The optical pickup lens 104 is detailed later.

During focus servo and tracking servo, the optical pickup lens 104 and the limiting aperture 105 co-operate in integration by an actuator, which is not shown.

In this embodiment, the transparent substrates of the optical discs 106, which are HD-DVD, DVD and CD, are made of polycarbonate and have the thicknesses of 0.6 mm, 0.6 mm and 1.2 mm, respectively. In FIG. 1, the optical discs 106a are HD-DVD and DVD and the optical disc 106b is CD.

The behavior of the laser beams emitted from the light sources 100, 101 and 102 which are reflected on the information recording surface of the optical disc 106 and then detected by a detection system is described hereinafter.

The laser beam emitted from the light source 100 passes through the beam splitters 107 and 108 and enters the collimator lens 103. The laser beam emitted from the light source 101 is reflected by the beam splitter 107, passes through the beam splitter 108 and enters the collimator lens 103. The laser beam emitted from the light source 102 is reflected by the beam splitter 108 and enters the collimator lens 103.

The collimator lens 103 transforms the laser beam emitted from the light source 100 and the laser beam emitted from the light source 101 from the divergent light into substantially parallel light. The collimator lens 103 further narrows down the angle of divergence of the laser beam emitted from the light source 102.

After passing through the collimator lens 103, the laser beam enters the limiting aperture 105 where the effective numerical aperture is limited. The laser beam having passed through the limiting aperture 105 then enters the optical pickup lens 104. The optical pickup lens 104 focuses the incoming light beam on the information recording surface of the optical disc 106 close to the diffraction limit. The laser beam reflected by the information recording surface of the optical disc 106 enters a detection system (not shown) through the optical pickup lens 104 and is detected therein. The detection system (not shown) detects the laser beam and photoelectrically converts the detected laser beam, thereby generating a focus servo signal, a track servo signal, a reproduction signal and so on.

The optical pickup lens 104 which is used in the optical pickup apparatus according to the first embodiment of the invention is described in detail below.

Figures 2, 12:
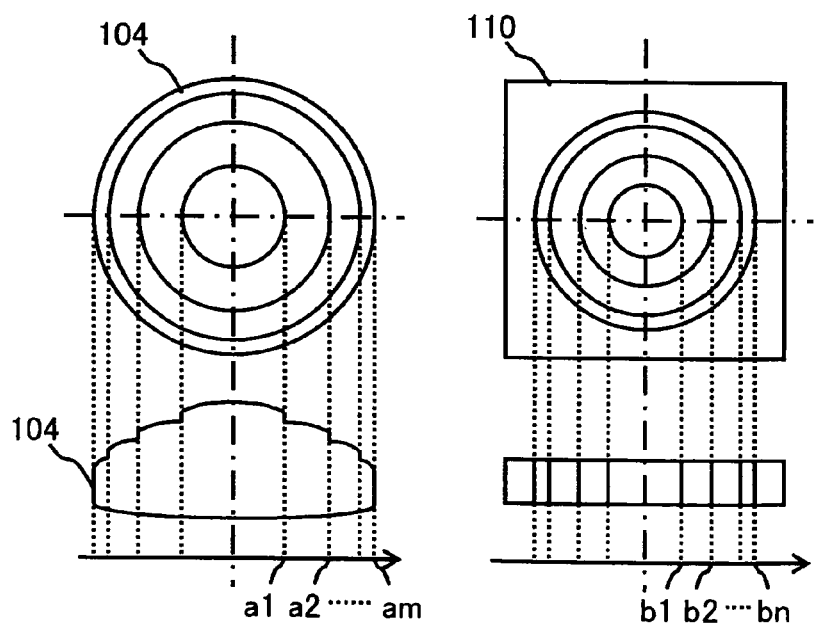
FIG. 2 is a schematic view of an optical pickup lens and according to an embodiment of the present invention.
FIG. 12 is a schematic view of a phase compensator according to an embodiment of the present invention.

The optical pickup lens 104 is a device that focuses a laser beam on the information recording surface of the optical disc 106 as described above. FIG. 2 is a view showing the front and the side of the optical pickup lens 104. One side of the optical pickup lens 104 of the first embodiment has a discontinuous aspherical shape as shown in FIG. 2. Specifically, on the laser beam incident surface of the optical pickup lens 104, a plurality of loop zonal recess or raised portions which generate phase differences are formed concentrically with a predetermined step height h different from adjacent loop zonal recess or raised portions. The shape of each aspherical surface which constitutes the loop zonal recess or raised portions is optimized to minimize the wavefront aberrations at the wavelength $\lambda 1$ for HD-DVD and the wavelength $\lambda 2$ for DVD.

A unit step height h of the loop zonal recess or raised portion is expressed as $h \sim m*\lambda 1/(n1-1)$ wherein represents a natural number, $\lambda 1$ is a light source wavelength for HD-DVD, and n1 represents a refractive index of an optical pickup lens.

Particularly, in the optical pickup lens of the first embodiment, a step having the unit step height h is formed in the loop zonal recess or raised portion and then the shape of the aspherical surface of each loop zone is optimized to reduce the wavefront aberrations at both the wavelength $\lambda 1$ for HD-DVD and the wavelength $\lambda 2$ for DVD.

Figure 3:
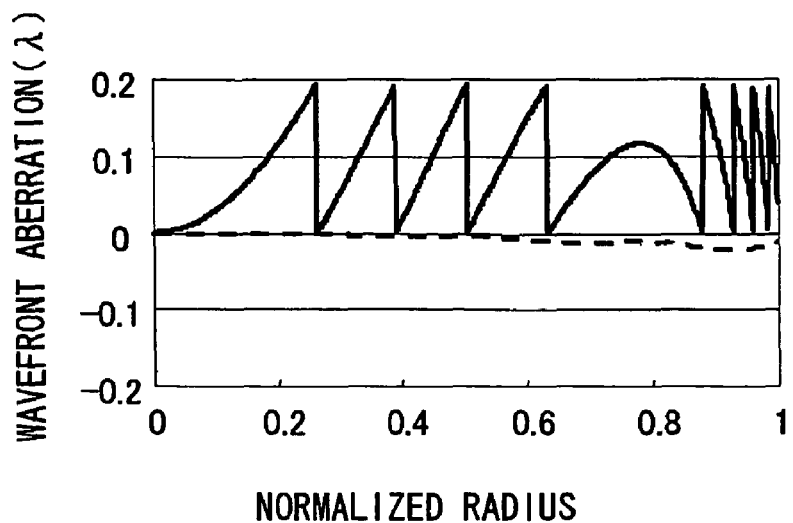
FIG. 3 is a view showing wavefront aberration on HD-DVD and DVD in an optical pickup lens according to a related art.

The wavefront aberration generated by the optical pickup lens which is disclosed in the above-mentioned Japanese Unexamined Patent Application Publication No. 11-287948 is described herein as a comparative example. FIG. 3 shows a calculation result of the wavefront aberration generated on the information recording surface of the optical pickup lens which is designed according to the data described in the above Publication. In FIG. 3, the horizontal axis shows a normalized radius of the optical pickup lens where "0" indicates the central axis of the optical pickup lens and "1" indicates the edge of the optical pickup lens, and the vertical axis shows wavefront aberration. Since the loop zonal structure of the optical pickup lens is formed in such a way that the loop zones are concentric to the central axis (optical axis), actual wavefront aberration distribution corresponds to the distribution of FIG. 3 rotated about the vertical axis of the graph. The dotted line of FIG. 3 indicates the wavefront aberration at the laser beam having the wavelength $\lambda 1$ for HD-DVD and the full line indicates the wavefront aberration at the laser beam having the wavelength $\lambda 2$ for DVD.

The graph of FIG. 3 shows that, though the wavefront aberration at the wavelength $\lambda 1$ for HD-DVD is substantially 0, the wavefront aberration at the wavelength $\lambda 2$ for DVD is about 60 m$\lambda$rms. This value is below the Marechal criterion 70 m$\lambda$rms that is a wavefront aberration limit to narrow down the laser beam close to the diffraction limit. However, respecting that it is unable to prevent the occurrence of wavefront aberration in the manufacturing stage caused by deflection of the lens surface during lens fabrication process and lens tilt due to assemble error during mounting to an optical head, the wavefront aberration value of about 60 m$\lambda$rms is not always practically sufficient.

From the above calculation result of wavefront aberration, the optical pickup lens disclosed in the above-mentioned Japanese Unexamined Patent Application Publication No. 11-287948 would appear to be designed in order to reduce the wavefront aberration at the wavelengths of the light sources used for DVD and CD. On the other hand, the optical pickup lens according to the first embodiment of the invention is designed in order to reduce the wavefront aberration at the wavelengths of the light sources used for HD-DVD and DVD so as to be compatible with optical discs capable of ultra high-density recording such as Blu-ray and HD-DVD. For easier understanding, the wavefront aberrations is converted into the wavefront aberration on the entrance pupil of the optical pickup lens by ray tracing.

Figure 4:
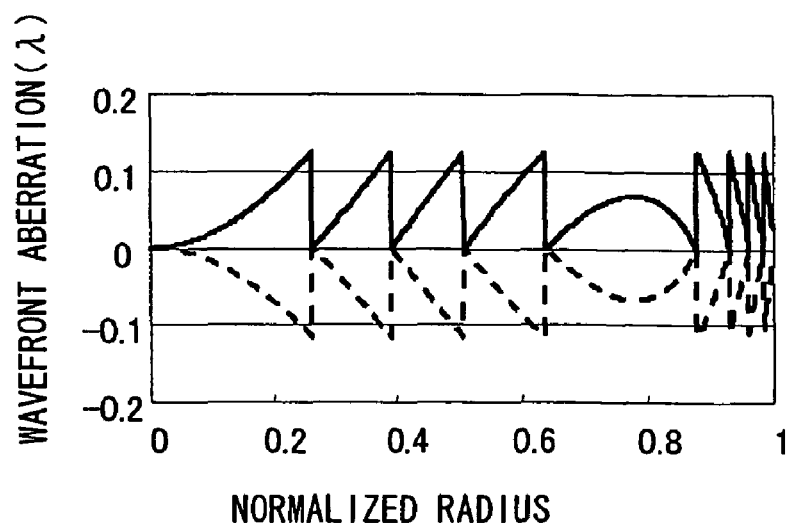
FIG. 4 is a view showing wavefront aberration on HD-DVD and DVD in an optical pickup lens according to an embodiment of the present invention.
Figures 5, 6:
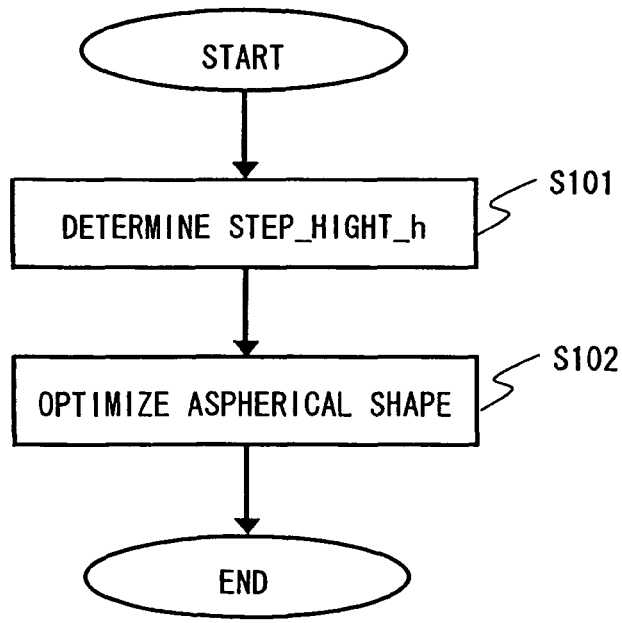
FIG. 5 is a view to describe a loop-zonal structure of an optical pickup lens according to an embodiment of the present invention.
FIG. 6 is flowchart showing a design method of an optical pickup lens according to an embodiment of the present invention.

FIG. 4 shows the wavefront aberration for HD-DVD and DVD in the optical pickup lens according to the first embodiment of the invention. In this optical pickup lens, the concentric loop zonal structure is formed on the laser beam incident surface side of the optical pickup lens, and the unit step height h of the loop zonal recess or raised portion that is expressed as $h \sim m*\lambda 1/(n1-1)$ is the value obtained at m=2. FIG. 5 shows the data about the position of the edge of the loop zone and the depth of the loop zone. The loop zone edge position in FIG. 5 indicates the position of the edge of each loop zone with respect to the normalized radius of the optical pickup lens (cf. FIG. 2). The step in FIG. 5 indicates the height of the step of each loop zone in the optical axis direction on the basis of the central position of the laser beam incident surface on each loop zone of the lens and is represented as a multiple of h. If the step height is positive, the loop zone is formed in the direction to reduce the lens thickness; if the step height is negative, the loop zone is formed in the direction to increase the lens thickness.

The optical pickup lens of the first embodiment is designed according to the flowchart of FIG. 6. Initially, the step height h is determined and the determined step height h is given to the loop zonal recess or raised portion (S101) The step S101 prepares in advance a calculation formula with the factors of both wavelengths $\lambda 1$ and $\lambda 2$, a lens refractive index n1 for a laser beam having the wavelength $\lambda 1$, a lens refractive index n2 for a laser beam having the wavelength $\lambda 2$ and a variable. Then, it determines the step height according to the calculation formula, setting the variable in a prescribed range.

After that, the shape of the aspherical surface of each loop zone is optimized to reduce the wavefront aberrations at the wavelength $\lambda 1$ for HD-DVD and the wavelength $\lambda 2$ for DVD.

Specifically, as disclosed in the commonly assigned Japanese Unexamined Patent Application Publication No. 2003-270528 (U.S. Pat. No. 6,678,096) for example, it is preferred that the laser beam of $\lambda 1$ and the laser beam of $\lambda 2$ are respectively focused on the optical disc having the substrate thickness of t1 and the optical disc having the substrate thickness of t2 with $1 \leq W_{max}/W_{min} < 1.8$ where a maximum wavefront aberration of the wavefront aberration caused by the laser beam having the wavelength $\lambda 1$ and the wavefront aberration caused by the laser beam having the wavelength $\lambda 2$ which pass through the concentric loop zonal structure is $W_{max}$ and a minimum wavefront aberration is $W_{min}$. A more preferred range is $1 \leq W_{max}/W_{min} < 1.6$ and a further preferred range is $1 \leq W_{max}/W_{min} < 1.4$. In addition, it is preferred that the RMS wavefront aberration caused by the laser beam of the wavelength $\lambda 1$ and the RMS wavefront aberration caused by the laser beam having the wavelength $\lambda 2$ which pass through the concentric loop zonal structure is equal to or less than $0.040\lambda$, or $0.035\lambda$ being more preferable. Alternatively, it is preferred that the laser beam of $\lambda 1$ and the laser beam of $\lambda 2$ which pass through the concentric loop zonal structure are respectively focused on the optical disc having the substrate thickness of t1 and the optical disc having the substrate thickness of t2 in such a way that the RMS wavefront aberration is $\{(W_1^2+W_2^2)/2\}^{1/2} \leq 0.028$ where $W_1$ is the wavefront aberration for the laser beam of $\lambda 1$ and $W_2$ is the wavefront aberration for the laser beam of $\lambda 2$. The RMS wavefront aberration is preferably 0.026 and more preferably 0.025 or further 0.023.

The calculation result of FIG. 4 shows that the rms value of the wavefront aberration at the wavelength $\lambda 1$ for HD-DVD is about 34 m$\lambda$rms and the rms value of the wavefront aberration at the wavelength $\lambda 2$ for DVD is about 35 m$\lambda$rms. As shown in FIG. 4, the graph of the wavefront aberration at the wavelength $\lambda 1$ and the graph of the wavefront aberration at the wavelength $\lambda 2$ are substantially axisymmetrical about the axis with the wavefront aberration value 0. Specifically, it is designed so that absolute values of the wavefront aberration at the wavelength $\lambda 1$ and the wavefront aberration at the wavelength $\lambda 2$ of are substantially equal and their positive and negative signs are different from each other. It is thereby possible to focus the laser beam on the information recording surfaces of the both optical discs close to the diffraction limit, even with the wavefront aberration generated during the manufacturing process.

As described in the foregoing, the optical pickup lens of this embodiment which determines the step height h, gives the determined step height h to the loop zonal recess or raised portion and then optimizes the shape of the aspherical surface constituting each loop zone enables the reduction of the wavefront aberration at both of two wavelengths used for two optical discs to a practically sufficient level. This is not achieved by the optical pickup lens disclosed in the above-mentioned Japanese Unexamined Patent Application Publication No. 11-287948.

The technique described in the foregoing enables the recording and reproduction of HD-DVD and DVD with one optical pickup lens. In the following, the technique for enabling the recording and reproduction of CD in addition to HD-DVD and DVD with one optical pickup lens is described.

Figure 7:
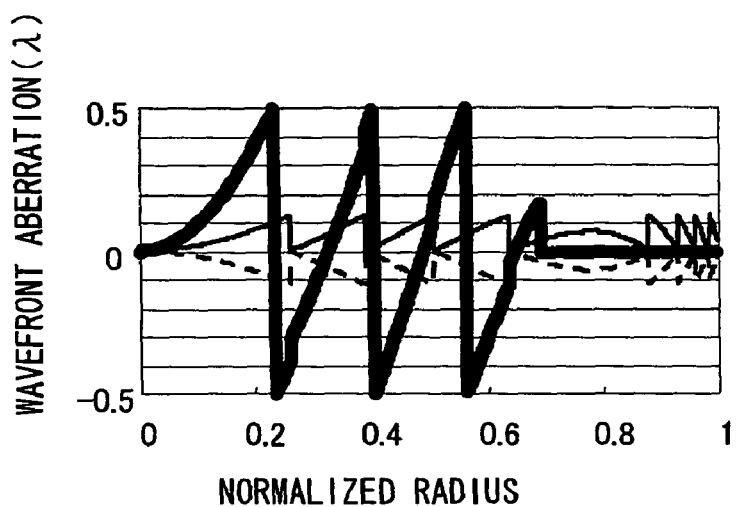
FIG. 7 is a view showing wavefront aberration on HD-DVD, DVD and CD in an optical pickup lens according to an embodiment of the present invention.

FIG. 7 shows the wavefront aberration in the case of applying the parallel luminous flux collimated from the laser beam for CD to the optical pickup lens 104 designed to reduce the wavefront aberrations both at the wavelength $\lambda 1$ for HD-DVD and the wavelength $\lambda 2$ for DVD. The dotted line of FIG. 6 indicates the wavefront aberration at the wavelength $\lambda 1$ for HD-DVD and the full line indicates the wavefront aberration at the wavelength $\lambda 2$ for DVD. The full heavy line indicates the wavefront aberration at the wavelength $\lambda 3$ for CD. Since the wavefront aberration related to CD is not compensated in any way, the wavefront aberration at the wavelength $\lambda 3$ for CD is as large as about 261 m$\lambda$rms. In this example, the numerical aperture for CD is 0.47 and the normalized radius in this case is about 0.72.

Figure 8:
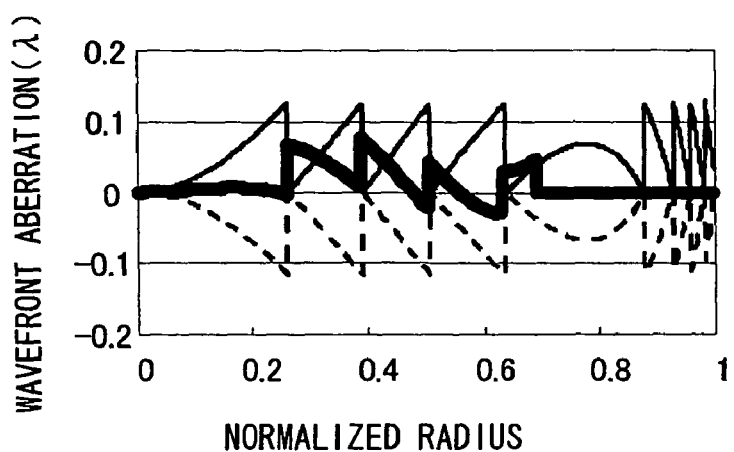
FIG. 8 is a view showing wavefront aberration on HD-DVD, DVD and CD in an optical pickup lens according to an embodiment of the present invention.

On the other hand, FIG. 8 shows the wavefront aberration in the case where a finite system is used for CD. In this specification, the "infinite system" refers to collimating a laser beam into parallel luminous flux and applying the parallel luminous flux to the optical pickup lens, and the "finite system" refers to applying a laser beam as divergent light to the optical pickup lens. In this case, the laser beam having the wavelength $\lambda 3$ for CD is incident on the optical pickup lens as divergent light (finite system), and then the wavefront aberration for CD as shown in FIG. 7 is corrected by using the characteristics that spherical aberration changes by changing the degree of divergence of the incident light, which is an object/image distance for the optical pickup lens in geometrical-optical term.

The wavefront aberration at the wavelength $\lambda 3$ for CD in FIG. 8 is about 27 m$\lambda$rms. It is thus possible to focus the laser beam close to the diffraction limit on the information recording surface of the optical disc, even with the wavefront aberration generated during the manufacturing process of the optical pickup lens. An object distance in this case is about 49.8 mm.

As described above, the optical pickup apparatus according to the first embodiment of the invention inputs the laser beams having the wavelength $\lambda 1$ for HD-DVD and the wavelength $\lambda 2$ for DVD in infinite system and inputs the laser beam having the wavelength $\lambda 3$ for CD in prescribed finite system to the optical pickup lens 104 which is designed to reduce the wavefront aberrations both at the wavelength $\lambda 1$ for HD-DVD and the wavelength $\lambda 2$ for DVD, thereby achieving compatibility among HD-DVD, DVD and CD with a single optical pickup lens 104.

When designing the concentric loop zonal structure of the optical pickup lens 104 in order to reduce the wavefront aberrations both at the wavelength $\lambda 1$ for HD-DVD and the wavelength $\lambda 2$ for DVD, it is preferred to design the concentric loop zonal structure so as not to cause a significant phase difference on the laser beam having the wavelength $\lambda 3$ for CD. Specifically, the phase difference (aberration) added to the light of the CD light source due to the loop zonal structure is preferably as close as possible to an integral multiple of the CD wavelength.

Figure 9:
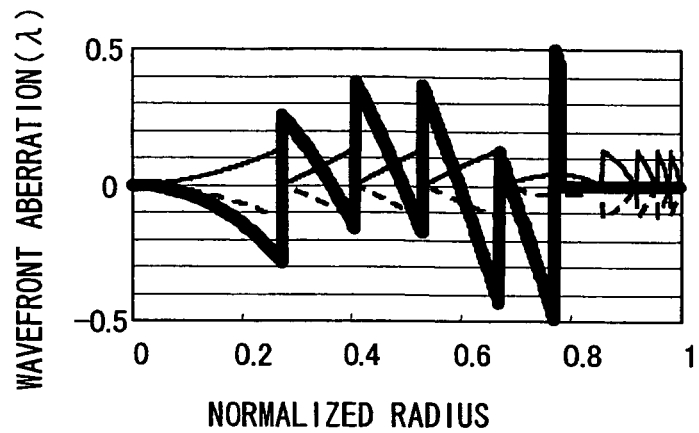
FIG. 9 is a view showing wavefront aberration on HD-DVD, DVD and CD in an optical pickup lens according to an embodiment of the present invention.

FIG. 9 shows the calculation result of the wavefront aberrations at the wavelength $\lambda 1$ for HD-DVD, the wavelength $\lambda 2$ for DVD and the laser beam having the wavelength $\lambda 3$ for CD in the unit step height h expressed as h$\approx$m*$\lambda 1$/(n1−1) as described above where m=3. Though the wavefront aberrations at the wavelength $\lambda 1$ for HD-DVD and the wavelength $\lambda 2$ for DVD are substantially the same as the wavefront aberrations shown in FIG. 8 where m=2, the wavefront aberration cannot be sufficiently reduced at the laser beam having the wavelength $\lambda 3$ for CD even with the finite system. A plurality of large discontinuities appear in the wavefront aberration at the laser beam having the wavelength $\lambda 3$ for CD, and the step of the loop zone is formed in the radius position, which causes a large phase difference to be added to the laser beam having the wavelength $\lambda 3$ for CD. It is difficult to reduce the wavefront aberration caused by the step of the loop zone at the laser beam with the wavelength $\lambda 3$ for CD sufficiently even with the finite system. On the other hand, though a plurality of large discontinuities appear also in the wavefront aberration at the laser beam having the wavelength $\lambda 3$ for CD shown in FIG. 8 as is the case with the graph of FIG. 9, any of those are equal to or less than 0.1$\lambda$, being small. This is because the step height h is such that it does not cause a significant phase difference on the laser beam having the wavelength $\lambda 3$ for CD.

Although the step height h which does not cause a significant phase difference on the laser beam having the wavelength $\lambda 3$ for CD is obtained when m=2, for example, in this embodiment, m=2 is not necessarily optimum for all cases since the unit step height h is defined as h$\approx$m*$\lambda 1$/(n1−1) and determined by the values of $\lambda 1$ and n1. In this embodiment, $\lambda 1$=405 nm and plastic is used as a lens material, thus n1=1.52. The effect of not causing a large phase difference on the laser beam having the wavelength $\lambda 3$ for CD while reducing the wavefront aberrations both at the wavelength $\lambda 1$ for HD-DVD and the wavelength $\lambda 2$ for DVD can be achieved just like the case of m=2 when m=8 and m=10 and so on. The step height which does not cause a significant phase difference on the laser beam having the wavelength $\lambda 3$ for CD is preferably determined so that the phase difference at each discontinuity in the wavefront aberration at the laser beam having the wavelength λ3 for CD is about 0.15λ smaller or more preferably 0.10λ or smaller in order to obtain the practically suitable wavefront aberration for CD. However, the partial exceeding of the phase difference of 0.15λ does not largely affect the entire wavefront aberration, and thus the step height should be determined keeping this in mind.

FIGS. 15 to 17 show the lens data of the optical pickup lens 104 and the disc 106 shown in FIG. 1 which is obtained as a result of the above optimization. FIG. 15 shows the data for HD-DVD, FIG. 16 shows the data for DVD and FIG. 17 shows the data for CD. The material of the optical pickup lens 104 is plastic or equivalent, and the material of the transparent substrate of the disc 106 is polycarbonate (PC). The refractive indexes of these materials for each wavelength are as shown in FIGS. 15 to 17. "AIR" means that the space between the planes is filled with air.

FIGS. 18 to 20 represent the aspherical shape of the optical pickup lens 104 by mathematical expression. In the coordinate system shown in FIG. 22, the shape of the aspherical lens surface is normally defined by its sag z as follows where $c=1/R$:

Expression 1:

$$z = \frac{cr^2}{1 + \sqrt{(1-(1+k)c^2r^2}} + \sum_{i=2}^{8} A_{2i}r^{2i} + B$$

FIGS. 18 to 20 are data that define the surface of the optical pickup lens 104 in the object side by using the parameter of Expression 1. Since the surface of the optical pickup lens 104 in the object side has a discontinuous aspherical shape as shown in FIG. 2, the aspherical shape is defined per each area that forms the discontinuous aspherical shape. The surface in the image side having a continuous aspherical shape is shown in FIG. 20. The "area range" in FIGS. 18 to 20 indicates a lens radius (in units of mm) where the aspherical shape represented by Expression 1 is effective in each area. "B" in FIGS. 18 to 20 indicates a sag amount (in units of mm) on an optical axis. The values of the parameters shown in FIGS. 18 to 20 are determined so as to reduce wavefront aberrations in recording or reproduction of HD-DVD and DVD as much as possible.

As shown in FIGS. 18 to 20, the surface of the optical pickup lens 104 in the object side is composed of nine loop-zonal areas. The first to seventh areas from the area including the optical axis toward the outside of the lens are commonly used for recording or reproduction of HD-DVD and DVD, and they are referred to herein as the HD-DVD/DVD common use areas. The eighth and ninth areas are used only for recording or reproduction of HD-DVD and not used for recording or reproduction of DVD, and they are referred to herein as the HD-DVD exclusive use areas.

Figures 21, 22:
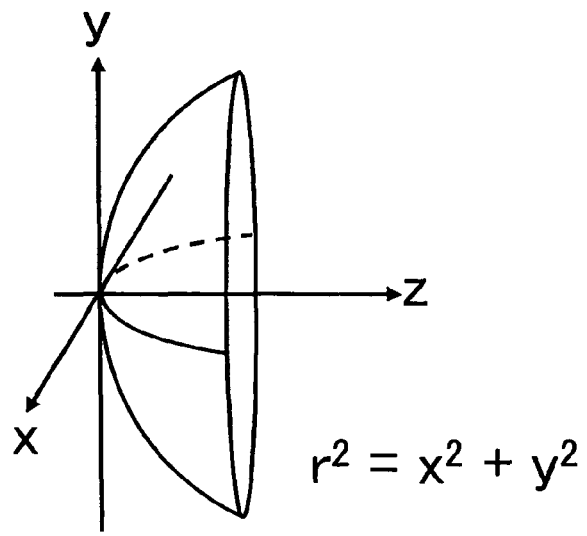
FIG. 21 is a table showing a difference in optical path length between a common use area and an exclusive use area of an optical pickup lens according to an embodiment the present invention.
FIG. 22 is a view showing a coordinate system in an optical pickup lens according to an embodiment the present invention.

FIG. 21 shows about how many times of the wavelength λ the substantial optical path length of the second to ninth zones that correspond to the HD-DVD/DVD common use area and the HD-DVD exclusive use area is deviated when a substantial optical path length of the first zone is a reference length in each aspherical area shown in FIGS. 18 to 20.

As shown in FIG. 21, the difference is 2 mλ (m is an integer) for HD-DVD with 405 nm wavelength and mλ for DVD with 655 nm wavelength and CD with 790 nm wavelength in the second to ninth zones. This is because the relationship of substantial optical path length differences described above is easily satisfied because the shorter wavelength λ1 is 380 to 430 nm, the longer wavelength λ2 is 630 to 680 nm, and λ3 is approximately 790 nm.

Second Embodiment

Figure 10:
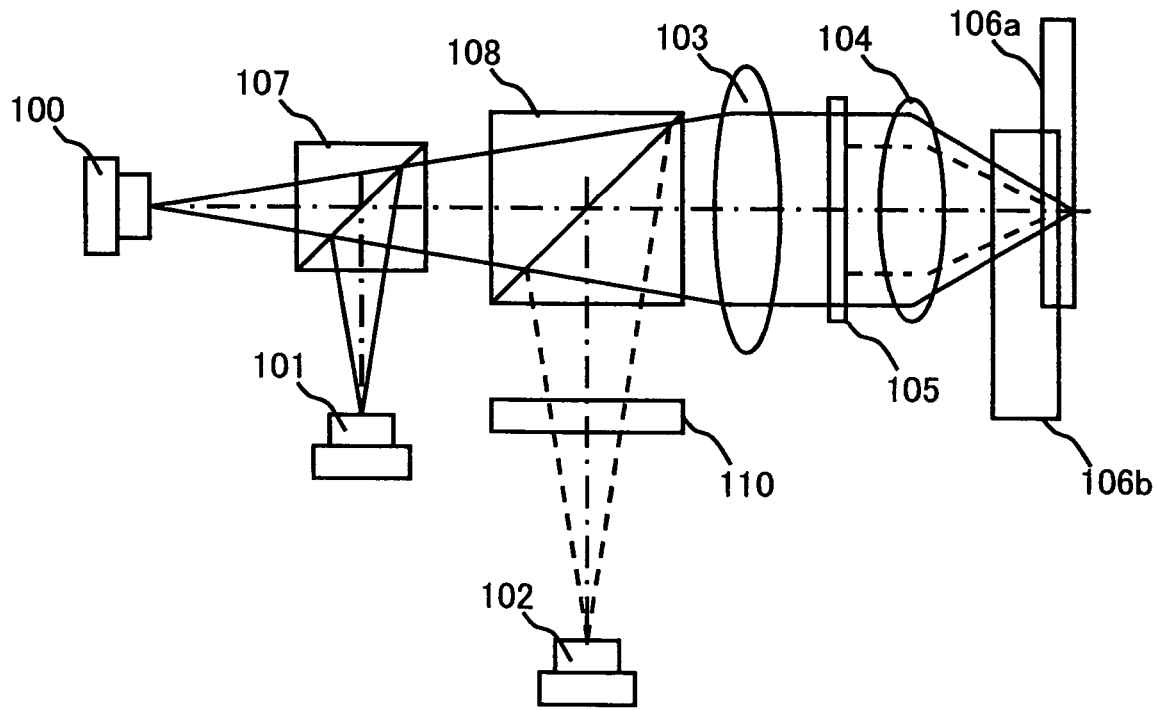
FIG. 10 is a schematic view of an optical pickup apparatus according to a second embodiment of the present invention.

FIG. 10 shows a structural example of the optical pickup apparatus according to a second embodiment of the present invention. The basic structure of the optical pickup apparatus is the same as that of the optical pickup apparatus according to the first embodiment shown in FIG. 1, and the optical pickup lens 104, which is a characteristic component of the apparatus, is also the same. The first embodiment reduces the wavefront aberration at the laser beam for CD by inputting the laser beam having the wavelength λ3 for CD to the optical pickup lens 104 in prescribed finite system. On the other hand, the second embodiment reduces the wavefront aberration at the laser beam for CD by inserting a phase compensator 110 into an optical path length of the light source 102 for CD and the polarizing beam splitter 108.

In the second embodiment, the laser beams from all the light sources 100, 101 and 102 are converted into substantially parallel light by the collimator lens 103 and enter the optical pickup lens 104. In this configuration, the wavefront aberration at the laser beam for CD is large as shown in FIG. 7 as described in the first embodiment.

Therefore, instead of using the finite system for CD as in the first embodiment, the second embodiment inserts the phase compensator 110 into the optical path of the light source 102 for CD and the polarizing beam splitter 108, thereby reducing the wavefront aberration at the laser beam for CD. The phase compensator 110 is described below.

Figure 11:
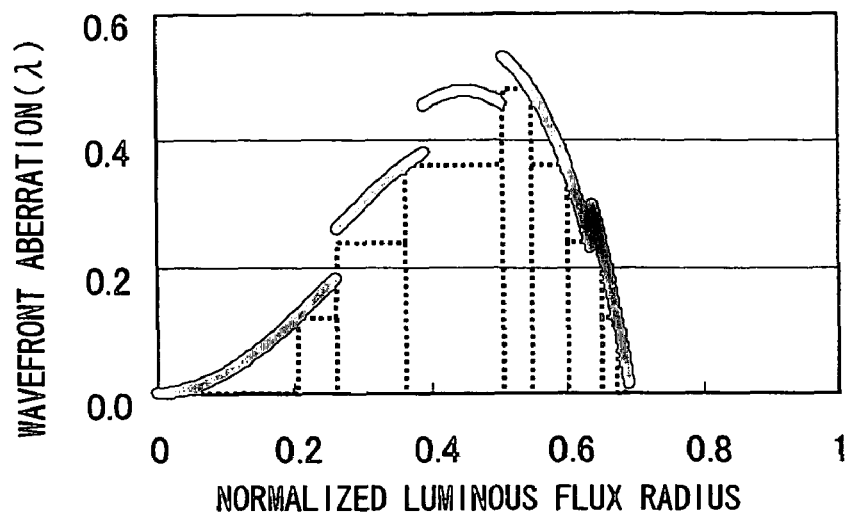
FIG. 11 is a view showing wavefront aberration when recording or reproducing CD without using a phase compensator according to an embodiment of the present invention.
Figure 13:
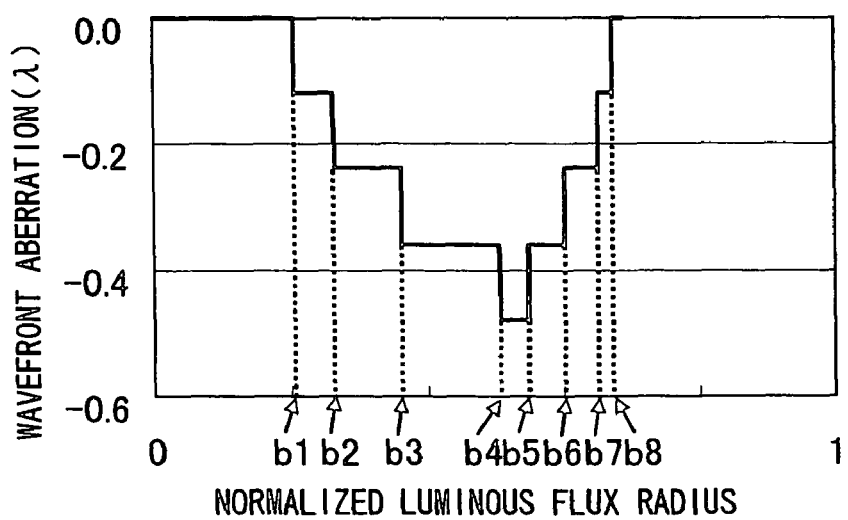
FIG. 13 is a view showing a phase difference due to phase compensator elements which constitute a phase compensator according to an embodiment of the present invention.

FIG. 11 shows the calculation result of the wavefront aberration in the case of using the infinite system for CD also. The wavefront aberration in this case is 0.5λ at maximum. FIG. 12 shows an example of the phase compensator 110 for reducing this wavefront aberration. The upper part of FIG. 12 illustrates the front view of the phase compensator 110 and the lower part illustrates the side view of the phase compensator 110. As shown in FIG. 12, the phase compensator 110 is composed of a plurality of concentric phase correcting elements, each of which causes a different amount of phase difference to a laser beam. In FIG. 12, the concentric phase correcting elements are indicated by p1, p2 . . . pn from the center of the phase compensator 110 and their extensions are indicated by b1, b2 . . . bn. In this embodiment, if phase differences caused by each phase correcting element are: p1=0λ, p2=−0.12λ, p3=−0.24λ, p4=−0.36λ, p5=−0.48λ, p6=−0.36λ, p7=−0.24λ, p8=−0.12λ and p9=0λ, the extensions of each phase correcting element are: b1=0.204, b2=0.262, b3=0.363, b4=0.507, b5=0.549, b6=0.601, b7=0.651, b8=0.674 and b9=1 as the values normalized by a maximum effective diameter at the insertion position of the phase compensator 110 which are inversely calculated from the maximum effective diameter of the optical pickup lens for HD-DVD and DVD (cf. FIGS. 11 and 13).

FIG. 14 shows the calculation result of wavefront aberration in the case where the wavefront aberration shown by the full line in FIG. 11 which cannot be reduced by the optical pickup lens 104 is reduced by using the phase compensator 110 when recording or reproducing CD. The wavefront aberration after compensation is about 40 mλrms, which is significantly improved. Though a phase difference caused by each phase correction element is a multiple of −0.12λ in this example, it may be a multiple of −0.10λ, for example, which enables further reduction of the rms value of wavefront aberration. In this case, however, the phase compensator 110 should be composed of a larger number of phase correction elements. Further, though a phase difference caused by each phase correction element is a multiple of a given value in this example, it is not necessary to set the phase difference caused by each phase correction element to a multiple of a given value. For example, it is feasible to set the extensions b1, b2 ... bn of the phase correcting elements so as not to correspond with discontinues points a1, a2, ... am of the optical pickup lens 104 (see FIG. 2) as much as possible. This technique is advantageous in that tolerance increases also for misalignment between the phase compensator 110 and the optical pickup lens 104.

The phase compensator 110 can be produced, for example, by forming a concentric loop zonal structure on a flat plate having a high light transmittance. For instance, in the second embodiment, the loop zonal structure may be designed so that a unit step height is such that a phase difference is within −0.2λ, more preferably −0.12λ between adjacent loop zones.

The lens data of the optical pickup lens 104 and the disc 106 in FIG. 10 are the same as those shown in FIGS. 15 to 17 and FIGS. 18 to 20.

Third Embodiment

Although the first embodiment and the second embodiment described above assume HD-DVD as an optical disc capable of ultra high-density recording, the same design is applicable when assuming Blu-ray. The third embodiment assume Blu-ray as an optical disc capable of ultra high-density recording.

FIGS. 23A to 23C show the lens data of the optical pickup lens 104 and the disc 106 shown in FIG. 1 which are obtained as a result of the above optimization. FIG. 23A shows the data for Blu-ray, FIG. 23B shows the data for DVD and FIG. 23C shows the data for CD. The material of the optical pickup lens 104 is glass or equivalent, and the material of the transparent substrate of the disc 106 is polycarbonate (PC). The refractive indexes of these materials for each wavelength are as shown in FIGS. 23A to 23C. "AIR" means that the space between the planes is filled with air.

FIGS. 24 to 29 represent the aspherical shape of the optical pickup lens 104 by mathematical expression. In the coordinate system shown in FIG. 22, the shape of the aspherical lens surface is normally defined by its sag z as above Expression 1 where c=1/R.

FIGS. 24 to 29 are data that define the surface of the optical pickup lens 104 in the object side by using the parameter of Expression 1. Since the surface of the optical pickup lens 104 in the object side has a discontinuous aspherical shape as shown in FIG. 2, the aspherical shape is defined per each area that forms the discontinuous aspherical shape. The surface in the image side having a continuous aspherical shape is shown in FIG. 30. The "range of h" in FIGS. 24 to 30 indicates a lens radius (in units of mm) where the aspherical shape represented by Expression 1 is effective in each area. "B" in FIGS. 24 to 30 indicates a sag amount (in units of mm) on an optical axis. The values of the parameters shown in FIGS. 24 to 30 are determined so as to reduce wavefront aberrations in recording or reproduction of Blu-ray and DVD as much as possible.

As shown in FIGS. 24 to 29, the surface of the optical pickup lens 104 in the object side is composed of thirty-one loop-zonal areas. The first to twenty-ninth areas from the area including the optical axis toward the outside of the lens are commonly used for recording or reproduction of Blu-ray and DVD, and they are referred to herein as the Blu-ray/DVD common use areas. The thirtieth and thirty-first areas are used only for recording or reproduction of Blu-ray and not used for recording or reproduction of DVD, and they are referred to herein as the Blu-ray exclusive use areas.

FIG. 31 shows about how many times of the wavelength λ the substantial optical path length of the second to thirty-first zones that correspond to the Blu-ray/DVD common use area and the Blu-ray exclusive use area is deviated when a substantial optical path length of the first zone is a reference length in each aspherical area shown in FIGS. 24 to 29.

Figure 32A:
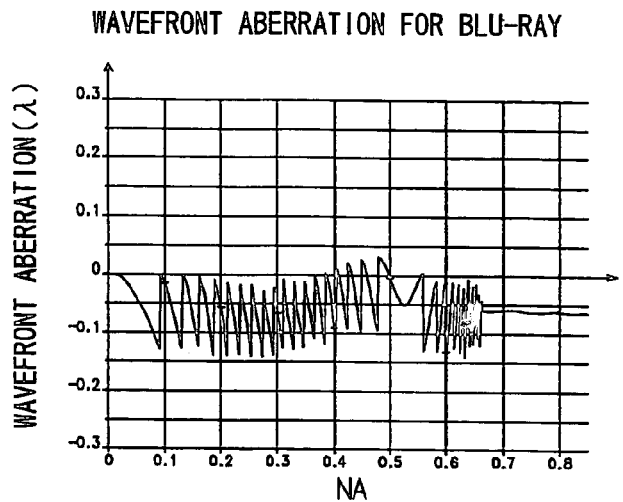
FIGS. 32A to 32C are views showing wavefront aberration on HD-DVD, DVD and CD in an optical pickup lens according to an embodiment of the present invention.
Figure 32B:
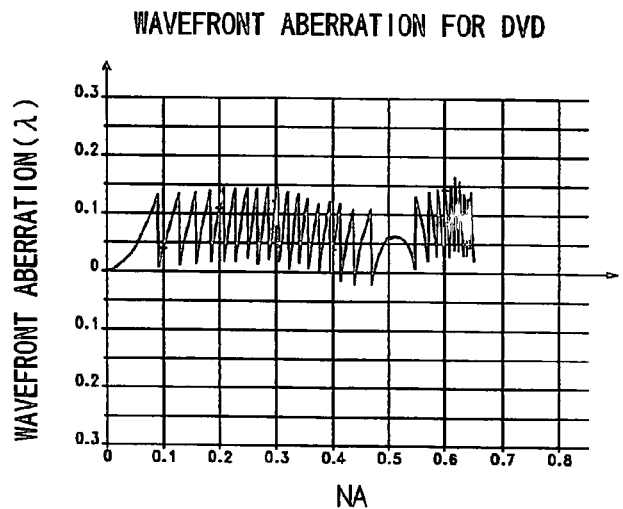
Figure 32C:
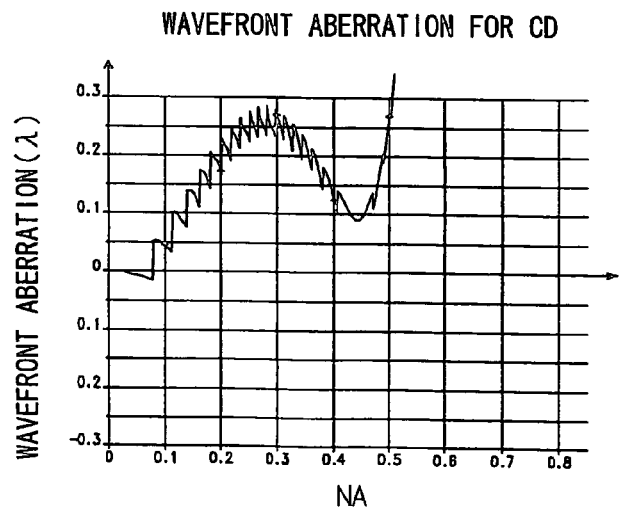

As shown in FIG. 31, the difference is 2 mλ (m is an integer) for Blu-ray with 405 nm wavelength and mλ for DVD with 655 nm wavelength and CD with 790 nm wavelength in the second to twenty-ninth areas. This is because the relationship of substantial optical path length differences described above is easily satisfied because the shorter wavelength λ1 is 380 to 430 nm, the longer wavelength λ2 is 630 to 680 nm, and λ3 is approximately 790 nm. FIGS. 32A to 32C show the wavefront aberrations for Blu-ray, DVD and CD.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical pickup lens that focuses laser beams having different wavelengths λ1, λ2 and λ3 on at least three kinds of optical discs, comprising:

a plurality of loop zonal recess or raised portions formed concentrically on at least one side of the optical pickup lens with a predetermined step height h different from adjacent loop zonal recess or raised portions, the plurality of loop zonal recess or raised portions being configured to generate phase differences, an individual aspherical surface being established in each of the plurality of loop zonal recess or raised portions, the plurality of loop zonal recess or raised portions being configured to compensate, by using an effect of refraction, wavefront aberration occurring when recording or reproducing an optical disc having a substrate thickness t1 by the laser beam having the wavelength λ1 and wavefront aberration occurring when recording or reproducing an optical disc having a substrate thickness t2 by the laser beam having the wavelength λ2, the step height h causing a phase difference of about 0.15λ or smaller to the laser beam having the wavelength λ3 when recording or reproducing an optical disc having a substrate thickness t3 by the laser beam having the wavelength λ3.

2. The optical pickup lens according to claim 1, wherein the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 have substantially the same absolute values and opposite positive/negative signs.

3. The optical pickup lens according to claim 1, wherein the wavelengths λ1, λ2, and λ3 of the laser beams satisfy: λ1<λ2<λ3.

4. The optical pickup lens according to claim 1, wherein the laser beam having the wavelength λ1 and the laser beam having the wavelength λ2 incident on the optical pickup lens are infinite system and the laser beam having the wavelength λ3 incident on the optical pickup lens is finite system.

5. The optical pickup lens according to claim 1,
wherein the wavelength λ1 is about 405 nm,
the wavelength λ2 is about 650 nm,
the wavelength λ3 is about 790 nm,
the substrate thickness t1 is about 0.1 mm,
the substrate thickness t2 is about 0.6 mm, and
the substrate thickness t3 is about 1.2 mm.

6. The optical pickup lens according to claim 1,
wherein the wavelength λ1 is about 405 nm,
the wavelength λ2 is about 650 nm,
the wavelength λ3 is about 790 nm,
the substrate thickness t1 is about 0.6 mm,
the substrate thickness t2 is about 0.6 mm, and
the substrate thickness t3 is about 1.2 mm.

7. The optical pickup lens according to claim 1,
wherein the laser beam having the wavelength λ1 and the laser beam having the wavelength λ2 are focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the plurality of loop zonal recess or raised portions is $W_{max}$ and a minimum wavefront aberration is $W_{min}$.

8. The optical pickup lens according to claim 1,
wherein an RMS wavefront aberration caused by the laser beam having the wavelength λ1 and an RMS wavefront aberration caused by the laser beam having the wavelength λ2 which pass through the plurality of loop zonal recess or raised portions are both 0.040λ or smaller.

9. An optical pickup lens that focuses laser beams having different wavelengths λ1, λ2 and λ3 on at least three kinds of optical discs, comprising:
a plurality of loop zonal recess or raised portions formed concentrically on at least one side of the optical pickup lens with a predetermined step height h different from adjacent loop zonal recess or raised portions,
the plurality of loop zonal recess or raised portions being configured to generate phase differences, an individual aspherical surface being established in each of the plurality of loop zonal recess or raised portions,
the plurality of loop zonal recess or raised portions being configured to cause, by using an effect of refraction, the laser beam having the wavelength λ1 and the laser beam having the wavelength λ2 to be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the plurality of loop zonal recess or raised portions is $W_{max}$ and a minimum wavefront aberration is $W_{min}$, both $W_{min}$ and $W_{max}$ being 0.040λ or smaller, and
the step height h causing a phase difference of about 0.15λ or smaller to the laser beam having the wavelength λ3 when recording or reproducing an optical disc having a substrate thickness t3 by the laser beam having the wavelength λ3.

10. The optical pickup lens according to claim 9,
wherein the step height h causes a phase difference of about 0.10λ, or smaller to the laser beam having the wavelength λ3 when recording or reproducing an optical disc having a substrate thickness t3 by the laser beam having the wavelength λ3.

11. The optical pickup lens according to claim 9,
wherein the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 have substantially the same absolute values and opposite positive/negative signs.

12. The optical pickup lens according to claim 9,
wherein the wavelengths λ1, λ2 and λ3 of the laser beams satisfy: λ1<λ2<λ3.

13. The optical pickup lens according to claim 9,
wherein the laser beam having the wavelength λ1 and the laser beam having the wavelength λ2 incident on the optical pickup lens are infinite system and the laser beam having the wavelength λ3 incident on the optical pickup lens is finite system.

14. The optical pickup lens according to claim 9,
wherein the wavelength λ1 is about 405 nm,
the wavelength λ2 is about 650 nm,
the wavelength λ3 is about 790 nm,
the substrate thickness t1 is about 0.1 mm,
the substrate thickness t2 is about 0.6 mm, and
the substrate thickness t3 is about 1.2 mm.

15. The optical pickup lens according to claim 9,
wherein the wavelength λ1 is about 405 nm,
the wavelength λ2 is about 650 nm,
the wavelength λ3 is about 790 nm,
the substrate thickness t1 is about 0.6 mm,
the substrate thickness t2 is about 0.6 mm, and
the substrate thickness t3 is about 1.2 mm.

16. The optical pickup lens according to claim 9,
wherein the laser beam having the wavelength λ1 and the laser beam having the wavelength λ2 which pass through the plurality of loop zonal recess or raised portions are respectively focused on the optical disc having the substrate thickness t1 and the optical disc having the substrate thickness t2 in such a way that RMS wavefront aberration is $\{(W_1^2+W_2^2)/2\}^{1/2} < 0.028$ where $W_1$ is wavefront aberration for the laser beam having the wavelength λ1 and $W_2$ is wavefront aberration for the laser beam having the wavelength λ2.

17. An optical pickup apparatus that records or reproduces information on optical discs respectively having substrate thickness t1, t2 and t3 by laser beams having different wavelengths λ1, λ2 and λ3, comprising:
a light source that emits the laser beams having the wavelengths λ1, λ2 and λ3; and
an optical pickup lens that receives the laser beams having the wavelengths λ1 and λ2 emitted from the light source as parallel light, receives the laser beam having the wavelength λ3 emitted from the light source as divergent light, and focuses the received laser beams onto the optical discs, at least one side of the optical pickup lens having a concentric loop zonal structure for compensating wavefront aberration occurring when recording or reproducing the optical disc having the substrate thickness t1 by the laser beam having the wavelength λ1 and wavefront aberration occurring when recording or reproducing the optical disc having the substrate thickness t2 by the laser beam having the wavelength λ2, the concentric loop zonal structure causing a phase difference of about 0.15λ or smaller to the laser beam having the wavelength λ3 when recording or reproducing the optical disc having the substrate thickness t3 by the laser beam having the wavelength λ3.

18. An optical pickup apparatus that records or reproduces information on optical discs respectively having substrate thickness t1, t2 and t3 by laser beams having different wavelengths λ1, λ2 and λ3, comprising:
a light source that emits the laser beams having the wavelengths λ1, λ2 and λ3; and
an optical pickup lens that receives the laser beams having the wavelengths λ1, λ2 and λ3 emitted from the light source as parallel light and focuses the received laser beams onto the optical discs, at least one side of the optical pickup lens having a concentric loop zonal structure, the concentric loop zonal structure causing the laser beam having the wavelength λ1 and the laser beam having the wavelength λ2 to be focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$, both $W_{min}$ and $W_{max}$ being 0.040λ or smaller, and the concentric loop zonal structure causing a phase difference of about 0.15λ or smaller to the laser beam having the wavelength λ3 when recording or reproducing an optical disc having a substrate thickness t3 by the laser beam having the wavelength λ3.

19. An optical pickup apparatus that records or reproduces information on optical discs respectively having substrate thickness t1, t2 and t3 by laser beams having different wavelengths λ1, λ2 and λ3, comprising:
a light source that emits the laser beams having the wavelengths λ1, λ2 and λ3;
an optical pickup lens that receives the laser beams having the wavelengths λ1, λ2 and λ3 emitted from the light source as parallel light and focuses the received laser beams onto the optical discs, at least one side of the optical pickup lens having a concentric loop zonal structure for compensating wavefront aberration occurring when recording or reproducing the optical disc having the substrate thickness t1 by the laser beam having the wavelength λ1 and wavefront aberration occurring when recording or reproducing the optical disc having the substrate thickness t2 by the laser beam having the wavelength λ2; and
a phase compensator formed on an optical path of the laser beam having the wavelength λ3, for adding a phase difference with a prescribed space distribution to the laser beam having the wavelength λ3, the phase compensator with the space distribution causing a phase difference of about 0.15λ or smaller to the laser beam having the wavelength λ3 when recording or reproducing the optical disc having the substrate thickness t3 by the laser beam having the wavelength λ3.

20. The optical pickup apparatus according to claim 17, wherein the wavefront aberration occurring when recording or reproducing the optical disc having the substrate thickness t1 by the laser beam having the wavelength λ1 and the wavefront aberration occurring when recording or reproducing the optical disc having the substrate thickness t2 by the laser beam having the wavelength λ2 have substantially the same absolute values and opposite positive/negative signs.

21. The optical pickup apparatus according to claim 19, wherein the phase compensator is formed by providing a concentric loop zonal structure on a flat plate.

22. The optical pickup apparatus according to claim 17, wherein the laser beam having the wavelength λ1 and the laser beam having the wavelength λ2 are focused respectively on the optical disc having the substrate thickness t1 and the optical disc having the substrate thickness t2 with $1 \leq W_{max}/W_{min} < 1.8$ where a maximum wavefront aberration of the wavefront aberration caused by the laser beam having the wavelength λ1 and the wavefront aberration caused by the laser beam having the wavelength λ2 which pass through the concentric loop zonal structure is $W_{max}$ and a minimum wavefront aberration is $W_{min}$.

23. The optical pickup apparatus according to claim 17, wherein an RMS wavefront aberration caused by the laser beam having the wavelength λ1 and an RMS wavefront aberration caused by the laser beam having the wavelength λ2 which pass through the concentric loop zonal structure are both 0.040λ or smaller.

24. The optical pickup apparatus according to claim 17, wherein the laser beam having the wavelength λ1 and the laser beam having the wavelength λ2 which pass through the concentric loop zonal structure are focused respectively on the optical disc having the substrate thickness t1 and the optical disc having the substrate thickness t2 in such a way that RMS wavefront aberration is $\{(W_1^2+W_2^2)/2\}^{1/2} < 0.028$ where $W_1$ is wavefront aberration for the laser beam having the wavelength λ1 and $W_2$ is wavefront aberration for the laser beam having the wavelength λ2.

* * * * *